(12) United States Patent
Cuervo et al.

(10) Patent No.: US 10,509,463 B2
(45) Date of Patent: Dec. 17, 2019

(54) MIXED REALITY OFFLOAD USING FREE SPACE OPTICS

(71) Applicant: Microsoft Technology Licensing, LLC, Redmond, WA (US)

(72) Inventors: Eduardo Cuervo, Bellevue, WA (US); Monia Ghobadi, Seatttle, WA (US); Krishna Chintalapudi, Bellevue, WA (US); Manikanta Kotaru, Stanford, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 63 days.

(21) Appl. No.: 15/817,007

(22) Filed: Nov. 17, 2017

(65) Prior Publication Data
US 2019/0155372 A1 May 23, 2019

(51) Int. Cl.
*G06F 3/02* (2006.01)
*G06F 3/01* (2006.01)
*G02B 26/08* (2006.01)
*H04B 10/11* (2013.01)
(Continued)

(52) U.S. Cl.
CPC .......... *G06F 3/011* (2013.01); *G02B 26/0816* (2013.01); *G06T 1/60* (2013.01); *H04B 10/11* (2013.01); *H04B 10/50* (2013.01)

(58) Field of Classification Search
CPC .................................................. G06F 3/0213
See application file for complete search history.

(56) References Cited

U.S. PATENT DOCUMENTS

| 6,101,038 | A | 8/2000 | Hebert et al. |
| 6,369,952 | B1 * | 4/2002 | Rallison .............. G02B 27/017 |
| | | | 359/630 |
| 9,285,893 | B2 | 3/2016 | Holz |

(Continued)

OTHER PUBLICATIONS

Statt, Nick, "Intel's new Project Alloy is a wireless VR headset for 'merged reality'", https://www.theverge.com/2016/8/16/12503948/intel-project-allow-vr-headset-cordless-mixed-reality, Published on: Aug. 16, 2016, 4 pages.

(Continued)

*Primary Examiner* — Nelson M Rosario
*Assistant Examiner* — Scott Au
(74) *Attorney, Agent, or Firm* — Fountainhead Law Group P.C.

(57) ABSTRACT

A virtual reality system including a head mounted display (HMD), a server, and a beam steering apparatus utilizes optical data transmission from the server to the HMD. The data rates/bandwidths provided by optical data transmission allow the amount of compression needed for data transfer (and the latency associated with compression) to the HMD to be reduced. The efficient offloading of processing tasks from the HMD to the server, reduces HMD power consumption, and enables the delivery of video having high resolution, framerate, and quality. As the user of the HMD moves, and the pose (position and orientation) of the HMD changes, the pose is provided to the server and beam steering apparatus. Based on the pose, the server renders image frames for transmission to the HMD and the beam steering apparatus directs an optical beam to the HMD to enable transmission of the image frames from the server to the HMD.

11 Claims, 13 Drawing Sheets

(51) Int. Cl.
*G06T 1/60* (2006.01)
*H04B 10/50* (2013.01)

(56) References Cited

U.S. PATENT DOCUMENTS

| | | | |
|---|---|---|---|
| 9,348,141 | B2 | 5/2016 | Bar-Zeev et al. |
| 9,497,501 | B2 | 11/2016 | Mount et al. |
| 9,544,054 | B1 | 1/2017 | Tiecke et al. |
| 9,573,062 | B1 | 2/2017 | Long et al. |
| 9,606,363 | B2 | 3/2017 | Zalewski |
| 2012/0105473 | A1 | 5/2012 | Bar-zeev et al. |
| 2015/0163473 | A1 | 6/2015 | Osawa et al. |
| 2016/0219325 | A1 | 7/2016 | Chu et al. |
| 2016/0232703 | A1 | 8/2016 | Duan et al. |
| 2017/0045941 | A1 | 2/2017 | Tokubo et al. |
| 2017/0261750 | A1* | 9/2017 | Wong ............... G02B 27/017 |
| 2018/0108110 | A1* | 4/2018 | Cuervo ................ G06T 1/60 |
| 2018/0364485 | A1* | 12/2018 | Mallinson ......... G02B 27/0172 |
| 2019/0012826 | A1* | 1/2019 | Melkote Krishnaprasad ............. G06T 15/205 |

OTHER PUBLICATIONS

Chen, Shenchang Eric, "QuickTime VR—An Image-Based Approach to Virtual Environment Navigation", In Proceedings of the 22nd annual conference on Computer graphics and interactive techniques, Sep. 15, 1995, pp. 1-10.

Lee et al., "Outatime: Using Speculation to Enable Low-Latency Continuous Interaction for Mobile Cloud Gaming", In Proceedings of 13th International Conference on Mobile Systems, Applications, and Services, May 18, 2015, pp. 1-14.

Chen, et al., "View interpolation for image synthesis", In Proceedings of the 20th annual conference on Computer graphics and interactive techniques, Aug. 2, 1993, pp. 279-288.

Mark, et al., "Post-Rendering 3D Warping", In Proceedings of Symposium on Interactive 3D Graphics, Providence, Apr. 27, 1997, pp. 1-10.

Cuervo, et al., "Poster: Mobile Virtual Reality for Head-mounted Displays With Interactive Streaming Video and Likelihood-based Foveation", In Proceedings of the 14th Annual International Conference on Mobile Systems, Applications, and Services Companion, Jun. 25, 2016, pp. 130-130.

Williams, Andrew, "Wireless HTC Vive tested: One of VR's problems solved, but two remain", https://arstechnica.com/gadgets/2017/02/htc-vive-wireless-tested-review/, Published on: Feb. 28, 2017, 4 pages.

Abrash, Michael, "Down the VR rabbit hole: Fixing judder", http://blogs.valvesoftware.com/abrash/down-the-vr-rabbit-hole-fixing-judder/, Published on: Jul. 26, 2013, 30 pages.

Frajka, et al., "Residual image coding for stereo image compression", In the Proceedings of International Conference on Image Processing, vol. 2, Sep. 22, 2002, 4 Pages.

"International Search Report & Written Opinion Issued in PCT Patent Application No. PCT/US18/060198", dated Apr. 5, 2019, 14 Pages.

Perkins, Michael G., "Data Compression of Stereopairs", In the Proceedings of IEEE Transactions on Communications, vol. 40, Issue: 4, Apr. 1, 1992, 13 Pages.

\* cited by examiner

MIXED REALITY OFFLOAD USING FREE SPACE OPTICS

BACKGROUND

Virtual reality systems that use head-mounted displays (HMDs) are attracting users by offering the potential of full sensory immersion in virtual environments. In order to create an illusion of full sensory immersion, a near-eye display of a HMD requires very heavy image processing and image rendering workloads. Low latency, high framerate, and high visual quality are all needed. Tethered virtual reality systems in which the HMD is bound to a server computer provide limited mobility and exploration, and are difficult to deploy widely. Mobile virtual reality systems in which untethered HMDs communicate with a server computer wirelessly are therefore being developed. However, it is common that the graphic processing units (GPUs) used in current wirelessly connected HMDs are too power-constrained to produce an acceptable framerate and latency, even for scenes of modest visual quality.

The development of new virtual reality systems using untethered HMDs will implement more powerful display and data processing technologies that will be able to take advantage of improved/faster data transmission techniques. These developments will provide an improved immersive virtual reality experience that minimizes perceivable visual artifacts and/or the introduction of substantial latency in the displayed virtual environment.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

The methods, systems and apparatus of the disclosure provide a virtual reality system that utilizes high speed data transmission using free-space optical communication and beam steering. In implementations of the virtual reality system, the data rates/bandwidth provided by the use of optical data transmission between a server and a head mounted display (HMD) allow the amount of compression needed for data transfer (and the latency associated with compression) to the HMD to be reduced. This allows efficient offloading of processing tasks from the HMD to the server, reduces HMD power consumption, and enables the delivery of video having high resolution, high framerate and high quality.

In an implementation, a system is configured to provide a virtual reality experience to a user wearing a head mounted display (HMD). The system may include the HMD, a server, and a beam steering apparatus. The HMD may be configured with video decoding and graphics capabilities. The user may move within a virtual environment of the system and view a scene of the virtual environment on the display portion of the HMD. As the user moves, and the pose (position and orientation) of the HMD relative to the virtual environment changes, pose tracking sensors on the HMD track movement and the HMD determines its pose. The pose determined by the HMD may be constantly updated by the HMD as the HMD moves. As the pose is updated, the HMD retrieves an appropriate panoramic frame from a frame cache using its current pose as a key by retrieving the panoramic frame within the cache having a pose that is the best matching entry for the key. The HMD then displays a view of the virtual environment to the user based on the retrieved panoramic frame. Concurrently, with retrieving and displaying the panoramic frames from the frame cache as the user moves within the virtual environment, the HMD also sends the determined pose to the server and a controller of the beam steering apparatus over wireless interfaces. As the pose is updated by the HMD, the HMD continues to send updated poses to the server and beam steering apparatus. The server uses the pose last received from the HMD to render an image frame comprising a panoramic frame and provides the rendered panoramic frame and associated pose (pose used to render the panoramic frame) to an optical transmitter.

The optical transmitter transmits a modulated optical beam that carries data, including rendered panoramic frames and associated poses to the beam steering apparatus. Based on the pose last received from the HMD at the beam steering apparatus, the beam steering apparatus steers the optical beam toward the HMD for reception by the HMD. The HMD includes one or more optical receivers and demodulates the optical beam including the data transmissions from the server that include the rendered panoramic frames and associated poses, and stores the panoramic frames to populate the frame cache. As the system operates, the frame cache on the HMD is continuously updated and populated with panoramic frames received from the server over the optical beam for the last pose sent to the server. As the frame cache is being populated and updated, the HMD continues to update the pose, retrieve appropriate panoramic frames from the frame cache that are the best match for the pose, and display a view of the virtual environment to the user. In the HMD, the process of retrieving the image frames from the frame cache and displaying the retrieved panoramic frames may be performed independently of the process of receiving the panoramic frames from the server and storing the received panoramic frames in the frame cache. If the optical data transmissions and panoramic frames sent from the server are not received for a period of time, the HMD continues to retrieve panoramic frames from the frame cache that are the best match for the current pose of the HMD, and display a view of the virtual environment to the user. The panoramic frames rendered and sent by the server may include images comprising color and depth information represented by full cube maps, partial cube maps, or a non-linear wide angle projection. The HMD may process the panoramic frames retrieved from the frame cache for display by performing image based rendering (IBR) on the retrieved frames. For example, if the panoramic frame includes a cube map, the HMD may process the retrieved frame for display by performing IBR in the form of mesh warping.

In various implementations, along with sending the panoramic frame that is rendered base on the latest received pose from the HMD, the server may generate additional views based on variations of the latest received pose and also send additional image frames comprising these additional views to the HMD. In an implementation, the additional views may be determined at the server using prediction techniques based on human motion kinematics and pose prediction. These additional views may be stored in the frame cache on the HMD with an associated pose and used for potential display to the user during periods when the optical data transmissions and panoramic frames sent from the server are not received at the HMD. These additional views aid the HMD in continuing to display a constant video stream, even when the user moves and disconnects. The large bandwidth that is available over the optical data connection between HMD and server allows potentially large amounts of data, including the rendered panoramic frames and the image frames including additional views as described above to be rendered at high resolutions and transferred to the HMD during periods of connection. Because of this, disturbances in the view displayed to the user may be minimized during periods of disconnection.

In another implementation, a system is configured to provide a virtual reality experience to a user wearing a head mounted display (HMD). The system may include the HMD, a server, and a beam steering apparatus. In this implementation, the server may determine the current pose of the HMD based on information from pose tracking sensors that monitor the movement of the HMD and communicate pose data to the server. The server may constantly update the determined pose as the system operates. In one example, the server may use prediction techniques based on human motion kinematics and pose prediction to determine a more accurate pose. The server may also send the pose to the beam steering apparatus as the pose is determined and updated. In this implementation, the server uses the last determined pose of the HMD to render an image frame comprising a full image frame of the virtual environment for display to the user and provides the rendered full image frame to an optical transmitter. The optical transmitter transmits an optical beam that carries data, including the rendered full image frame to the beam steering apparatus. Based on the last pose received from the server, the beam steering apparatus steers the optical beam toward the HMD for reception at optical receivers on the HMD. The HMD then displays the full image frames as the frames are received from the server. At any time when the optical data transmissions and full image frames sent from the server are not received at the HMD, the HMD may continue to display the last received frame until a new frame is received.

DETAILED DESCRIPTION

Figure 1A:
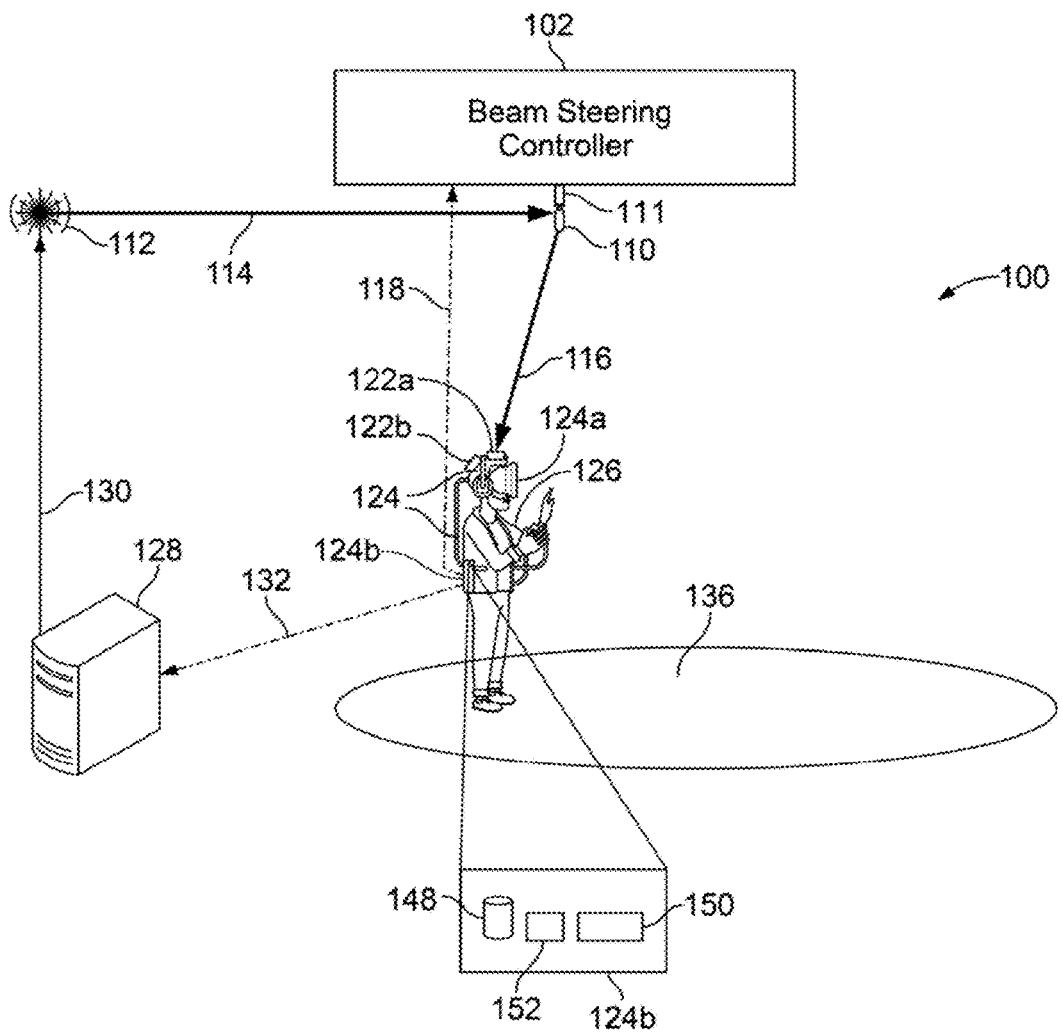
FIG. 1A is a simplified diagram illustrating an example virtual reality system.

The system, devices, and methods will now be described by use of example embodiments. The example embodiments are presented in this disclosure for illustrative purposes, and are not intended to be restrictive or limiting on the scope of the disclosure or the claims presented herein.

The system, devices, and methods of the disclosure utilize free-space optics and remote rendering (offload) to provide augmented and mixed virtual reality experiences that may match or surpass the quality and fidelity of virtual reality experiences provided through the use of audio/visual cables such as High-Definition Multimedia Interface (HDMI) and DisplayPort cables. The example implementations do not rely on Wi-Fi or 60 Ghz Wireless to provide an audio/video connection but instead use free-space optics to wirelessly transmit large amounts of video information from a server equipped with high-quality rendering capabilities to a head mounted display (HMD) worn by a user. The server may render an image frame for display at the HMD based on a current pose (position and orientation) of the HMD determined and sent by the HMD to the server. The server may then send the rendered image frame in a modulated optical beam carrying data at a high data rate to a beam steering apparatus. The beam steering apparatus may precisely steer the beam to optical receivers on the head-mounted display (HMD). The beam steering apparatus may utilize the current HMD pose as sent to the beam steering apparatus by the HMD to steer the beam.

As display and graphics processing unit (GPU) technologies evolve, increasing higher display resolutions and display frame rates will be available for use in virtual reality systems. Current roadmaps from display, GPU and video cable manufacturers show that display resolutions of up to 8K at frame rates of 480 frames per second will be supported in the near future. However, current roadmaps for Wi-Fi or 60 GHz wireless technology indicate that Wi-Fi or 60 GHz wireless may not provide enough bandwidth, or may not be available within a time frame, to allow full utilization of the potential display resolutions and frame rates that will soon be available from GPU technologies. Delivering these higher frame rates and resolutions using insufficient bandwidth would force a 60 GHz implementation to use heavier video compression, and introduce substantial latency and visual artifacts into displayed images, degrading the virtual reality experience.

The implementations provide a consistent video experience with minimal to no degradation through the transmission of image frames that include both color and depth information over optical beams. The implementations rely on the human visual system being less sensitive to detail during fast head and/or body motion and account for the fact that during periods of fast motion the HMD may lose connectivity to the server over the optical beam. In an implementation, to account for loss of connectivity, image based rendering (IBR) transformations in the client on the HMD may be used to redisplay image frames that were determined based on a previous pose at the server and received at the HMD before losing connectivity. These previously received image frames may be used as close approximations to the image frames the HMD client expected to receive. Also, in another implementation, additional views rendered from different angles or with different levels of depth-peeling as related to a current pose may be sent in additional image frames accompanying the image frame rendered for that current pose. These additional image frames may be cached and used during disconnections. Also, potential future image frames may be speculatively rendered at the server based on a prediction model for kinematics of human motion and data generated by HMD pose tracking sensors. These potential future image frames may be sent to the HMD along with the image frames for a current pose. These speculatively rendered potential future image frames may also be used to mitigate latency and supplement image display during disconnections.

The implementations also may be configured to benefit from the predictability of user movements that occur within a short time horizon in order to maintain the connection on the optical beam. In an implementation, a prediction model that considers the kinematics of human motion may be used in the beam steering apparatus to estimate the next position to which the optical beam should be steered based on a current pose of the HMD and/or data generated by HMD pose tracking sensors. If a high confidence prediction can be determine, the optical beam may be speculatively steered for the next pose of the HMD to minimize disconnections of the optical link.

Because the implementations require large data transfers both within the server (for example, in the path between the server processor and the optical transmitter) and within the HMD (for example, in the path between the optical receiver, the HMD processor, and the display) the implementations may be advantageously configured to avoid excessive latency through these paths. This may be realized in both the server and HMD by using remote direct memory access (RDMA) transfers between the network interface controller (NIC) and the processor or, by using devices with unified memory directly accessible by the NIC and the processor.

The use of free-space optics in the implementations provides an advantage in that it allows the transfer of image frames at a high data rate that allows a virtual reality system to be realized without the use of compression or with reduced use of compression for image frame transmission. This avoids or reduces the latency found in conventional virtual reality systems that is associated with this compression. The use of free-space optics in the implementations allows a high frame rate that provides high resolution video for a high quality virtual reality experience. Also, use of free-space optics in the implementations allows HMD power consumption to be reduced by offloading expensive CPU and GPU computation to the server while still providing a high quality virtual reality experience. As a general rule, the data transmissions rates available may be considered inversely proportional to the size of the photodetector(s) comprising the optical receiver on the HMD. An HMD implementation based on arrays of smaller photodetectors may reach very high data transmission rates, from tens to hundreds of gigabits per second. In HMD implementations using a non-array type system, the minimum size of the photodetector that can be supported is determined by the precision and accuracy of the HMD tracking system.

FIG. 1A is a simplified diagram illustrating an example virtual reality system according to an implementation of the disclosure. System 100 includes a beam steering apparatus comprising a beam steering controller 102, motor 111, and mirror assembly 110. System 100 also includes server 128, HMD 124, and optical transmitter 112. FIG. 1A shows user 126 wearing HMD 124 and moving within a virtual reality environment provided by system 100. HMD 124 may comprise a display portion 124a for wearing on user's 126 head. HMD 124 may also include a processing unit 124b that is coupled to display portion 124a and that may be carried on a belt or backpack. Display portion 124a may also include optical receivers 122a and 122b. Processing unit 124b includes frame cache 148, central processing unit/graphics processing unit (CPU/GPU) 152, and a Wi-Fi transmitter 150. In alternative implementations, the functions shown in processing unit 124b may be integrated into head mounted display portion 124a to form a single integrated unit for wearing on the head of user 126. In an implementation, optical transmitter 112 may comprise a laser transmitter and optical receivers 122a and 122b may comprise photo diodes. Server 128 may be connected to laser transmitter 112 over data link 130 that may comprise optical fiber.

In operation, system 100 allows user 126 to move within a virtual environment covered approximately by circular area 136 and view scenes of the virtual environment 136 on display portion 124a of HMD 124. For example, the virtual environment may be presented to user 126 as scenes of a virtual environment in which a game is played, a simulated reality is presented, or a training simulation takes place.

As user 126 moves, and the pose (orientation and location) of HMD 124 changes relative to the virtual environment, sensors in HMD 124 track movement to allow CPU/GPU 152 to continuously determine and update the pose, and user 126 is presented with a view of the virtual environment from the changing perspective of user 126. Also, as user 126 moves, CPU/GPU 152 retrieves panoramic frames from frame cache 148 based on the current pose of HMD 124 relative to the virtual environment. CPU/GPU 152 performs image based rendering (IBR) on the retrieved panoramic frames and displays the view of the virtual environment on display portion 124a. HMD 124 also continuously sends the updated pose to server 128 and beam steering controller 102 over wireless interfaces 132 and 118, respectively, as user 126 moves within the virtual environment. Alternatively, HMD 124 may continuously sends the updated pose by broadcasting data over a single interface to server 128 and beam steering controller 102. In an implementation, the pose may be defined by a set of coordinates $((x, y, z), (\theta, \varphi, \Psi))$. The parameters $(x, y, z)$ may represent the position of HMD 124 in 3D coordinates in relation to the virtual environment, while the parameters $(\theta, \varphi, \Psi)$ may represent the view orientation (sometimes referred to as rotation) as an Euler angle comprising yaw, pitch, and roll, respectively, of HMD 124. In other implementations, the pose may be defined using other coordinates or parameters. For example, the pose may be defined using quaternions instead of Euler angles.

Server 128 uses each pose received from HMD 124 to render a panoramic image frame and provide the rendered panoramic image frame and its associated pose over data link 130 to optical transmitter 112. Optical transmitter 112 then transmits an optical beam 114 that carries data, including the panoramic image frame and its associated pose, toward mirror assembly 110. Mirror assembly 110 is adjusted by beam steering controller 102 and motor 111 to direct the optical beam 114 as optical beam 116 toward HMD 124 for reception at optical receivers 122a and 122b. As system 100 operates, the frame cache 148 in HMD 124 is continuously populated with panoramic frames received from server 128 so that user 126 is provided with a changing view of the virtual environment as HMD 124 retrieves the panoramic frames from frame cache 148 and displays views to user 126.

Figure 1B:
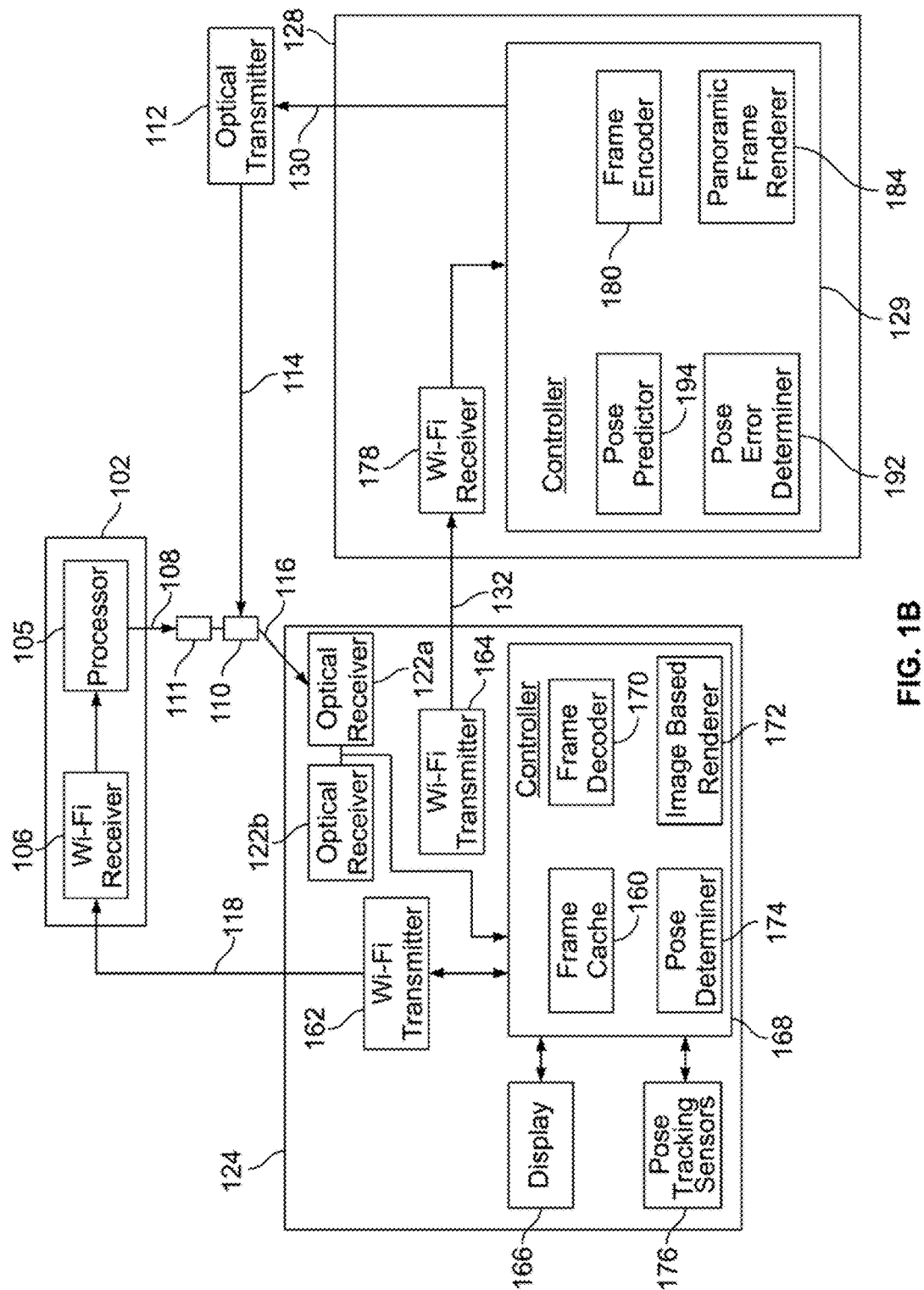
FIG. 1B is a simplified block diagram illustrating functions within the components of the system of FIG. 1A.

FIG. 1B is a simplified block diagram illustrating functions within the components of the system of FIG. 1A. FIG. 1B shows portions of beam steering controller 102, HMD 124, and server 128. HMD 124 includes display 166, pose tracking sensors 176, Wi-Fi transmitter 162, optical receivers 122a and 122b, Wi-Fi transmitter 164, and controller 168. Controller 168 may provide functions performed by CPU/GPU 152 of FIG. 1A and includes frame cache 160, pose determiner 174, frame decoder 170, and image based renderer 172. Beam steering controller 102 includes processor 105 and Wi-Fi receiver 106. Server 128 includes Wi-Fi receiver 178 and controller 129. Controller 129 includes pose predictor 194, pose error determiner 192, frame encoder 180, and, panoramic frame render 184. Optical transmitter 112 is shown in FIG. 1B as implemented as a separate component from server 128, although in other implementations optical transmitter 12 may be integrated into server 128 to form one unit. Controller 168, controller 128, and processor 105 may be implemented using any type of processing circuitry, hardware and/or software, or using any combination of processing circuitry, hardware or software, and include memory for storing programs that provide appropriate functions. The operation of beam steering controller 102, HMD 124, and server 128 in system 100 will be explained with reference to FIGS. 2A, 2B, and 2C.

Figure 1C:
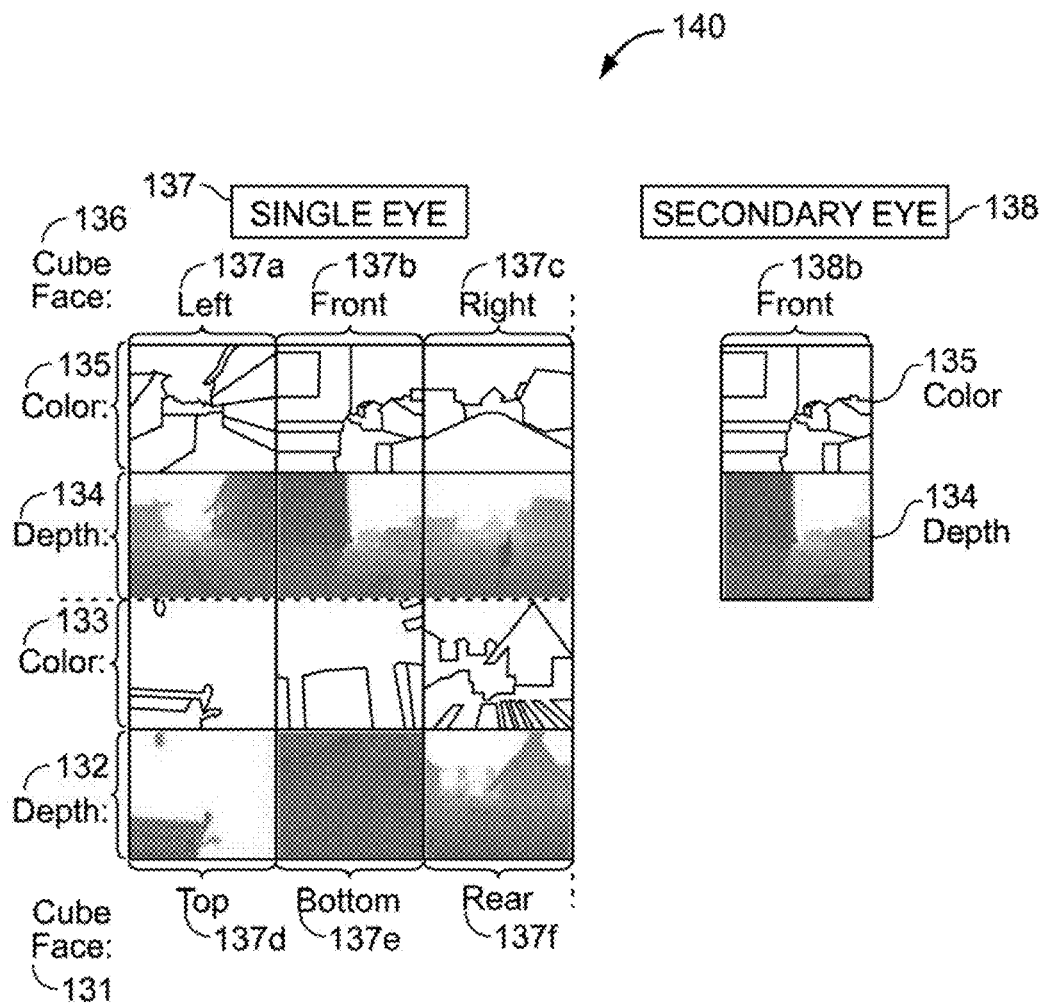
FIG. 1C is a diagram illustrating an example panoramic image frame.

FIG. 1C is a diagram illustrating an example type of panoramic image frame that may be used in an implementation of FIGS. 1A and 1B. In this implementation, each panoramic image frame may consist of a high resolution frame that is shown in FIG. 1C as image frame 140, and that is comprised of cube maps. This type of panoramic image frame may be created by panoramic frame renderer 184 of server 128 and sent to HMD 124 for display over optical link 114. Each panoramic image frame/cube map may be defined and associated with respect to a pose, $p=((x, y, z), (\theta, \varphi, \Psi))$. For example, the parameters $(x, y, z)$ may represent the position of HMD 124 in 3D coordinates in relation to the virtual environment, while the parameters $(\theta, \varphi, \Psi)$ may represent the view orientation (sometimes referred to as rotation) as an Euler angle comprising yaw, pitch, and roll, respectively, of HMD 124. Alternately, the orientation may be represented as a quaternion $(a, b, c, d)$. The use of an appropriate image based rendering (IBR) technique, such as mesh warping, on panoramic frames comprising cube maps allows reconstruction of nearby views that are translated or rotated with respect to the panoramic image frame's associated pose. Internally, an image frame is composed of cube maps that are each a 360° representation of an environment. The cube map draws a panoramic image on the six sides of a cube, with the center point of the cube being the current pose. In the layout of FIG. 1C, the image frame consists of single eye cube maps 137 and secondary eye front faces 138, and has a total of 14 faces.

The cube maps and front faces in image frame 140 include single eye color (RGB) cube map, single eye depth cube map, secondary eye color (RGB) front face, and secondary eye depth front face. For example, in FIG. 1C, the single eye color (RGB) cube map comprises the 3 faces in each of the color rows 135 and 133, (6 total faces) that are in the single eye half 137 (left half) of FIG. 1C, and the single eye depth cube map comprises the three faces in each of the depth rows 134 and 132 (6 total faces) that are in the single eye half 137 (left half) of FIG. 1C. The secondary eye color (RGB) front face is comprised of the face in the color row 135 (1 face) that is in the secondary eye half 138 (right half) of FIG. 1C and the secondary eye depth front face comprises the face in the depth row 134 (1 face) that is in the secondary eye half 138 (right half) of FIG. 1C. Each face represents a view perspective. For example, in FIG. 1C, the 3 faces in the color row 135 of the single eye RGB cube comprise left, front, and right views shown in the left 137a, front 137b, and right 137c, columns, respectively. The 3 faces in the color row 133 of the single eye RGB cube comprise top, bottom, and rear views shown in the top 137d, bottom 137e, and rear 137f, columns, respectively. The face in the color row 135 of the secondary eye RGB front face comprises the front view shown in the front 138b column. The 3 faces in the depth row 134 of the single eye RGB cube comprise left, front, and right views shown in the left 137a, front 137b, and right 137c, columns, respectively. The 3 faces in the depth row 132 of the single eye RGB cube comprise top, bottom, and rear views shown in top 137d, bottom 137e, and rear 137f columns, respectively. The face in the depth row 134 of the secondary eye RGB front face comprises the front view shown in the front 138b column. The positions of the single eye cube maps 137 and the positions of the secondary eye front faces 140 may be each offset from the frame's pose by a parameter defined as half the inter-pupillary distance (IPD), which may be a user-specific or averaged anatomical property that represents the distance between human eyes.

In the example of FIG. 1C, using the partial secondary eye cube maps provides reasonable tradeoff between bandwidth and quality. The front views shown in the secondary eye front face 138 can be used to supplement the front views in the single eye cube map 137 when rendering images in HMD 124. If the data connection between server 128 and HMD 124 is strong, the reprojected difference for each rendered image of a view (the difference between the poses associated with the image frames used in the image based rendering) will be small and the front views shown in the secondary eye cube map 138 should adequately cover the rendered view, without needing any additional secondary eye views. If the data connection suffers latencies or long disconnections, the expected reprojected distance will be longer, making the IPD component insignificant and removing the advantage provided by the redundancy of using complete separate left and right eye cube maps.

In another implementation complete separate left and right eye cube maps, each including 12 views and similar to the single eye cube map 137 of FIG. 1C, may be used separately in order to generate a stereo view. In this case, the separate cube map positions may also be each offset from the frame's pose by the parameter defined as half the IPD described above, which may be a user-specific or averaged anatomical property that represents the distance between human eyes. In this implementation, the use of left and right eye cube maps provides substantial data redundancy while requiring additional bandwidth as compared to, for example, the implementation of FIG. 1C.

The depth cube maps are not necessary for representing the RGB pixel content of the scene, but are useful during the mesh warping step. The cube maps in every frame may be stored consistently at a fixed canonical orientation looking straight ahead, i.e., $(\theta, \varphi, \Psi)=(0, 0, 0)$.

In other implementations, image frame (cube map) or view mapping may be configured in any other appropriate way. For example, the cube maps may be laid out in mono for only one eye (left or right) and the other eye may be represented by using image based rendering (IBR). The cube map may also be laid out for one eye (left or right) with an additional view of the cube map from another perspective to prevent disocclusions. Other combinations of views are also possible. For example, the cub map maybe laid out with left and right eye views used in combination with an additional view.

In other implementations of FIGS. 1A and 1B, panoramic frames comprised of any type of nonlinear wide angle projection other than a cube map may be used and any appropriate type of IBR may be used at the HMD to render images for display. For example, non-linear representation may be used to better distribute resolution. In another alternative implementation a spherical layout mapping may be used. In another example, partial cube maps may be used. Also, the depth information may be encoded in a separate frame from the color information frame. For example, the depth may be encoded using a different compression scheme (better suited to encode depth) in a separate frame and two cube maps may be used in parallel.

Additionally, in other implementations, the color space of the cube map may be encoded in any other appropriate color space, for example, YUV. Also, high dynamic range (HDR) images may be encoded in a scRGB color space (described in International Electrotechnical Commission (IEC) standard 61966-2-2), or in an xvYCC color space (described in IEC standard 61966-2-4).

Figures 2A, 2B:
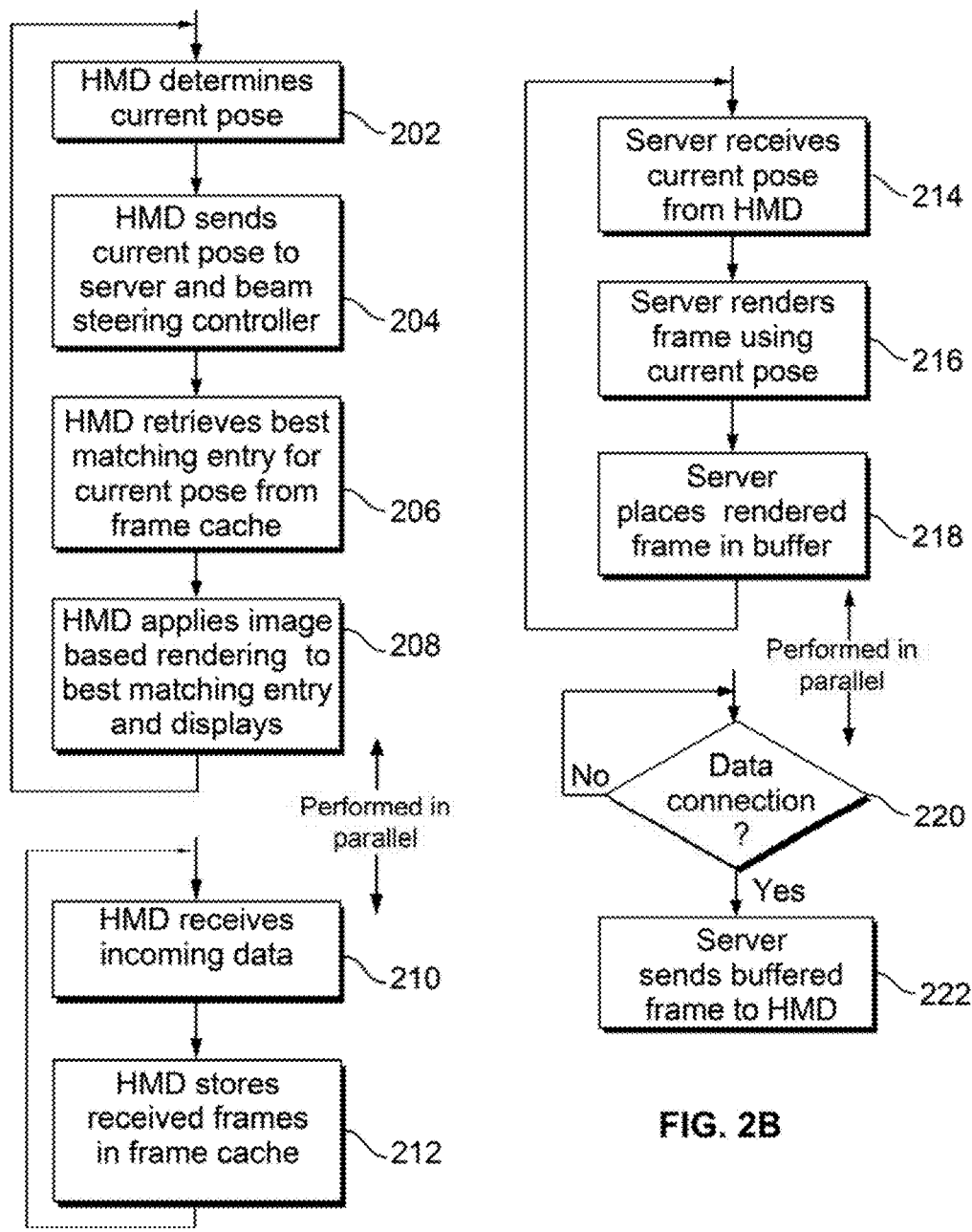
FIG. 2A is a simplified flow diagram illustrating example operations performed by a head mounted display.
FIG. 2B is a simplified flow diagram illustrating example operations performed by a server.

Referring again to FIG. 2A, FIG. 2A is a simplified flow diagram illustrating example operations performed by a head mounted display (HMD). In an implementation, the HMD of FIG. 2A may be implemented as HMD 124 of FIGS. 1A and 1B. FIG. 2A shows two threads of operations (202-208 and 210-212) that may be performed in parallel.

At 202, HMD 124 determines its current pose. The current pose comprises a position and a view orientation of HMD 124 generated by pose determiner 174 from data received from pose tracking sensors 176. The position is the location of player 126 in 3D space of the virtual environment and the view orientation is a rotation vector that represents where user 126 is looking.

At 204, controller 168 of HMD 124 initiates transmission to send the current pose to server 128 and beam steering controller 102 through Wi-Fi transmitter 162 and Wi-Fi transmitter 164, respectively.

At 206, controller 168 of HMD 124 retrieves a best matching panoramic image frame entry from frame cache 160 for the current pose. In an implementation in which the panoramic frames comprise cube maps, R-trees may be used to provide fast lookup using a Cache Key (CK) comprising a pose, and return a Cache Value (CV) structure containing a reference to a retrieved image frame (cube map). Euclidean distance vectors may be used to locate the closest matching image frame cube map for a given requested CK pose. Controller 168 may initiate a nearest-neighbor search using an R-tree by constructing a set of minimally overlapping bounding boxes that each includes subsets of points (the panoramic image frame positions) in the 3D space. The use of the bounding boxes eliminates large portions of the search. Controller 168 locates the correct bounding box for the R-tree and determines the distance from each existing point to the target point (the desired pose's position) and selects the R-tree closest neighbor point. Controller 168 then determines the nearest neighbor R-tree image frame from the R-tree closet neighbor point and retrieves the nearest neighbor R-tree image frame. Because the current set of image frames stored in frame cache 160 most likely does not include an image frame associated with a pose that exactly matches the current pose of HMD 124, the nearest neighbor R-tree image frame may be used to approximate the desired result. However, simply substituting a view centered at a pose p in lieu of a desired view at pose p' may result in a poor visual experience providing uncomfortable visual stuttering and disocclusions. Therefore, IBR may be applied to the image frame retrieved at 206 in order to derive an appropriate view for the current pose.

At 208, controller 168 of HMD 124 applies image based rendering to the panoramic image frame retrieved at operation 206 using image based renderer 172 and displays the rendered image frame at display 166. Controller 168 then returns to operations 202 and repeats operations 202-208. In the implementation using panoramic frames comprising cube maps, the IBR may be performed using mesh warping. In an example implementation of mesh warping, given an RGB cube map and matching depth cube map both at pose p (for example, of the left eye), a novel view v' may be rendered as if it had been taken from a new pose p'. Each pixel of the original view may be mapped to a 3D position (since p and the depth map are known), and then the 3D position may be re-projected to a pixel in the new view (since p' is known). The final view v' resolution may be proportional to the size of the image frame. Using an example two eye field of view for HMD 124 with 106° height and 94° width, a 4 k image frame (3840→2160) generates 720p final view frames (1280→720). With a single eye field of view, the field of view width can be divided by two and still produce a 720p final frame. In other implementations, use of a non-linear wide angle projection in place of cube maps can provide a comparable high quality with fewer pixels.

In certain situations, if the translation is too great (i.e., the position of p and the position of p' are too far apart) then v' will suffer from visual artifacts such as disocclusions. For example, when posed looking at an open doorway and then stepping forward; from the original view, it is unclear what should appear in the disoccluded "holes" that are now visible. In this case, additional cube maps may be used to handle translations that are beyond a threshold, as is provided by the additional image frames. Conversely, since the cube map covers a panoramic view, mesh warping is robust to arbitrary changes in rotation without introducing artifacts. In implementations in which non-linear wide angle projections are used, the non-linear wide angle projections may not cover the full panoramic space and very large rotations within the view space may not be supported. It is for this reason that cache entries with these projections may be indexed with position and orientation information. Some view orientations may lead to lower quality visuals (because the resolution in the panoramic view is non-uniform). These non-linear wide angle projections may be preferred when disconnections are rare and short and/or bandwidth is insufficient to transfer full cube maps.

In parallel with performing operations 202-208, controller 168 will also perform operations 210 and 212. At 210, HMD 124 receives incoming data comprising one or more incoming panoramic frames from server 128. Controller 168 receives the incoming data from one or both of optical receivers 122a and 122b which demodulate an optical beam 116 carrying data sent from optical transmitter 112. Optical beam 116 is steered to HMD 124 by beam steering controller 102 using motor 111 and mirror assembly 110. The one or more incoming panoramic frames in the received data may be image frames that were generated by server 128 based on a pose sent to server 128 prior to the sending of the current pose at 204. The process used in server 128 to generate the panoramic frames will be explained further in relation to FIG. 2B.

At 212, HMD 124 stores the one or more panoramic frames received at operation 210 in frame cache 160. Controller 168 may control frame decoder 170 to decode the received data into one or more received panoramic frames and associated pose data. Controller 168 may then store each panoramic image frame and its associated pose in frame cache 160. HMD 124 may continue to repeat operations 202-208 and 210-212, each time retrieving the panoramic image frame that best matches the current pose determined at 206 from frame cache 160, performing image base rendering, and displaying the rendered image. As HMD repeats operations 202-208 and 210-212, image frames may be received from server 128, that were rendered in server 168 based on the latest current pose received at server 168, and stored in frame cache 160. If either of the optical links 114 and 116 is not operational and no image frames are being received at operation 210, HMD 124 will continue to perform operations 202 through 208 using the panoramic frames previously stored in frame cache 160 until more panoramic frames are received at 210. The repetition of operations 202-208 and 210-212 may be repeated at a frame rate which provides a desired quality of display for the virtual reality environment. Use of the process of FIG. 2A allows HMD 124 to function and provide views even if the optical links are broken at any time.

FIG. 2B is a simplified flow diagram illustrating example operations performed by a server. FIG. 2B shows two threads of operations (214-218 and 220-222) that may be performed in parallel. In an implementation, the server of FIG. 2B may be implemented as server 128 of FIGS. 1A and 1B. The process of FIG. 2B may be performed by server 128 during the same time period in which HMD 124 is performing the process of FIG. 2A.

The process begins at 214 where server 128 receives a current pose of HMD 124 from HMD 124. Controller 129 may receive the current pose of HMD 124 though Wi-Fi transmitter 178 as the current pose is sent from HMD 124 for each repetition of operation 204 of FIG. 2A. Pose error determiner 192 may then measure the pose error induced by the user's movements. Pose error determiner 192 may provide the pose error measurements to pose predictor 194. Pose predictor 194 may predict a pose base on the received current pose, past current poses, and pose error measurements to generate the predicted pose for the user in real time.

At 216, image based renderer 184 uses the predicted pose from pose predictor 192 to render a panoramic image frame and provide the rendered panoramic image frame to frame encoder 180. Frame encoder 180 encodes the rendered panoramic image frame and its associated pose (the pose used to render that frame) for transmission on the optical link 114. The predicted pose is used to adjust for the fact that by the time the rendered panoramic frame is transferred and stored in the frame cache 160 of HMD 124, the current pose used to retrieve a best matching panoramic image frame from frame cache 160 may already have been updated in HMD 124 and be different from the last pose sent to server 128.

At 218, controller 129 places the encoded rendered panoramic image frame in a buffer and returns to repeat operation 214.

In parallel with performing operations 214-218, controller 129 will also perform operations 220-222. At 220, controller 129 determines if a data connection is available on optical links 114 and 116 between server 128 and HMD 124. If a data connection is available, controller 129 continues to monitor for a data connection. When a data connection is available the process moves to 222 and controller 129 initiates transmission of the image frame last buffered at 218 to HMD 124 over optical links 114 and 116. If the data connection is not available, controller 129 may continue to perform operations 214-218 to receive the current pose from HMD 124, render stereo cube maps based on the current pose, and buffer image frames for transmission to HMD 124 until the data connection is available. When the data connection is available operation 222 is initiated to transmit the image frame last buffered at 218 to HMD 124.

In an implementation, panoramic frame render 184 may also render additional views at 216 based on the current pose and send the additional views to HMD 124 to be used to provide robustness in image display at HMD 124. The additional views may be in the form of frames including RGB plus depth or any other type of color plus depth representation.

For example, panoramic frame renderer 184 may use several predictions of likely future poses generated at pose predictor 118 based on a current pose to render an additional view for each of the likely future poses. Image frames for each of the several likely additional views may then be sent to HMD 124 for storing in frame cache 160. In another implementation, additional views rendered from different angles or with different cache of depth-peeling as related to a current/predicted pose may be sent in as additional image frames accompanying the image frame rendered for that current pose and sent to HMD 124 for storing in frame cache 160. The additional views described above may be used in implementations with panoramic frames comprising full cube maps, partial cube maps, or various types of nonlinear wide angle projections.

The image frame comprising the additional views cached in frame cache 160 may be useful during disconnections of the data connection between HMD 124 and server 128. For example, if the data connection is down and no new panoramic frames are being received from server 128, it may turn out that the one or more image frames comprising the additional views provide a better match for the current pose of the HMD than any panoramic image frame based on a received pose at the server 128. These additional views may be used to supplement image display and mitigate latency during disconnections, preventing visual stuttering and disocclusions in the view displayed to user 126.

Also, in a further implementation, image frames comprising potential future additional views may be speculatively rendered at the server based on a prediction model for kinematics of human motion and data generated by HMD pose tracking sensors or other sensors in system 100. These image frames comprising potential future additional views may be sent to the HMD along with the image frames for a current pose. These speculatively rendered potential future views may also be used to mitigate latency and supplement image display during disconnections.

The large bandwidth that is available over the optical data connection between HMD 124 and server 128 allows potentially large amounts of data, including the rendered panoramic frames and the image frames including additional views as described above, so that disturbances in the view displayed to user 126 may be minimized during periods of disconnection.

Figure 2C:
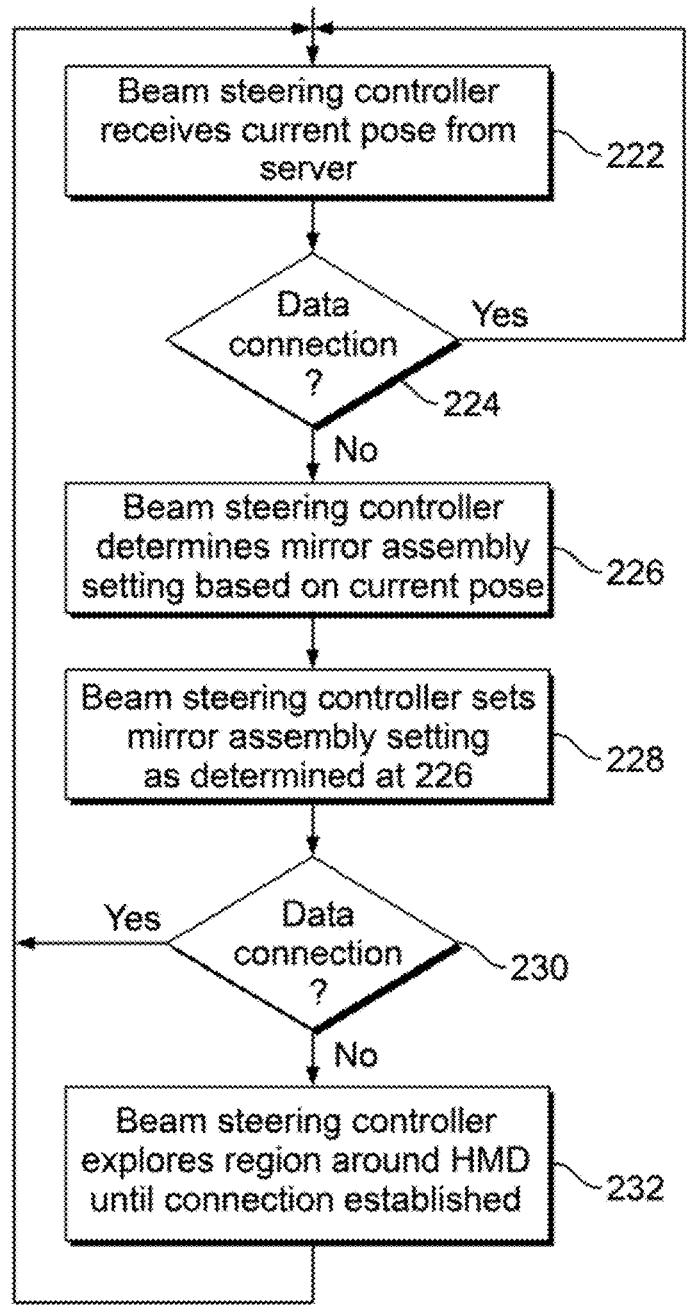
FIG. 2C is a simplified flow diagram illustrating example operations performed by a beam steering apparatus.

FIG. 2C is a simplified flow diagram illustrating example operations performed by a beam steering controller. In an implementation, the beam steering controller of FIG. 2C may be implemented as beam steering controller 102 of FIGS. 1A and 1B. The process of FIG. 2C may be performed by beam steering controller 102 during the same time period when HMD 124 and server 128 are performing the processes of FIGS. 2A and 2B, respectively. By performing the process of FIG. 2C, beam steering controller 102 controls motor 111 and mirror assembly 110 to implement the data connection between server 128 and HMD 124 over optical beams 114 and 116.

The process begins at 222 where the beam steering controller 102 receives the current pose of HMD 124 from HMD 124. Wi-Fi receiver 106 may receive the pose over wireless link 118 from Wi-Fi transmitter 162 of HMD 124. In one implementation, the pose may be sent by HMD 124 consistent with the frame rate at which HMD 124 displays the rendered images from IBR renderer 172 in the process of FIG. 2A.

At 224, processor 105 determines if there is a data connection currently available over optical links 116 and 114 with the current configuration setting of mirror assembly 110. If there is a data connection available, the process moves back to 222 where processor 105 will wait to receive the next current pose from HMD 124. If there is no data connection available, the process moves to 226. Processor 105 may determine if a data connection is currently available by monitoring for an indication comprising feedback received from Wi-Fi transmitter 162 of HMD 124 over wireless link 118. For example, server 128 may periodically send an optical beam carrying a beacon/test signal over optical link 114 to mirror assembly 110 of beam steering controller. If mirror assembly is correctly configured to steer the optical beam to optical receiver 122a and/or optical receiver 122b of HMD 124 to be received at a desired power level, HMD 124 may signal to beam steering controller 102 that the data connection is available each time HMD 124 receives the beacon/test signal.

At 226, processor 105 determines a setting for mirror assembly 110 based on the received current pose. In an implementation, processor 105 may use a support vector regression model to predict the optimum setting as a function of the current pose of HMD 124. The support vector regression model may be created by a calibration process in which an optimum setting of the mirror assembly for each of a set of test poses of HMD 124 are determined. Each of the test poses and their optimum settings may then be used create the vector regression model. Additionally, in a further implementation, the vector regression model may incorporate human motion prediction using, for example a hidden Markov model, a deep neural network (DNN) model, or error smoothing (e.g. a Kalman filter) in conjunction with data about detection of user motion vs sensor-error. Also, feedback from an accelerometer and gyroscope implemented in the pose determiner 174 of HMD 124 may be utilized. Use of these various implementations may increase the likelihood that the mirror assembly setting is adjusted because the user actually moved, not because there was noise in the headset position estimation.

At 228, processor 105 controls motor 111 to configure mirror assembly 110 according to the setting determined at 226 so that optical beam 114 sent from server 128 through optical transmitter 112 is steered toward HMD 124 as optical beam 116.

At 230, processor 105 determines if the data connection between server 128 and HMD 124 has been established by the configuring of the mirror assembly 110 performed at 228. If the data connection is established the process moves back to 222. If the data connection is not established the process moves to 232.

At 232, processor 105 adjusts the setting determined at 228 based on a variation of the current pose and controls motor 11 to configure mirror assembly 110 according to the adjusted setting. The adjusted setting causes the optical beam 114 that is sent from server 128, through optical transmitter 112, to be steered toward HMD 124 as optical beam 116 at incrementally different angles and/or locations. Processor 105 then determines if the data connection between server 128 and HMD 124 is established. If the data connection is not established, processor 105 will continue to adjust the setting for the mirror assembly 110 to gradually explore the region around the current pose (last received pose) of HMD 124 until the connection is established. Also, if a new current pose is received from HMD 124 during operation 232, the process moves back to 222 where controller 105 receives a new current pose.

Figure 3A:
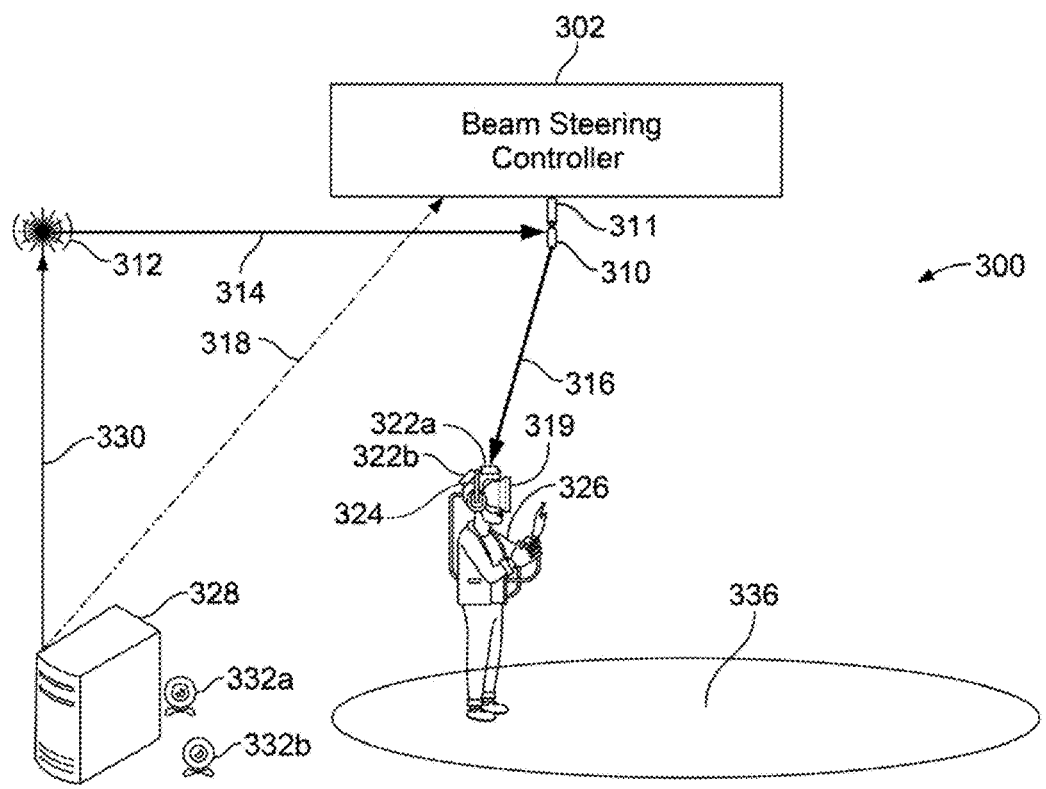
FIG. 3A is a simplified diagram illustrating another example virtual reality system.

FIG. 3A is a simplified diagram illustrating another example virtual reality system. System 300 includes a beam steering apparatus comprising a beam steering controller 302, motor 311, and mirror assembly 310. System 300 also includes server 328, HMD 324, position sensor 332a, position sensor 332b, and optical transmitter 312. FIG. 3A shows user 326 wearing HMD 324 and moving within a virtual reality environment 336 provided by system 300. HMD 324 may comprise a display portion 319 and be worn on the head of user 326. Display portion may also include optical receivers 322a and 322b. In an implementation, optical transmitter 312 may comprise a laser transmitter and optical receivers 322a and 322b may comprise photo diodes. Server 328 may be connected to optical transmitter by data link 330. Data link 330 may comprise an optical fiber and server 328 may be connected to data link 330 by an HDMI connection In operation, system 300 allows user 326 to move within a virtual environment represented approximately by area 336 and view scenes of the virtual environment on display portion 319 of HMD 324. As user 326 moves and the pose (orientation and location) of HMD 324 changes, position sensors 332a and 332b track the movement of HMD 324 and provide position data to server 328. Position sensors 332a and 332b may be connected to server 328 through a wireless data channel or a through a cable. Server 328 uses the position data to determine a current pose of HMD 324 and render appropriate full image frames. The rendered full image frames are then sent over data link 330 to optical transmitter 312.

Optical transmitter 312 then transmits an optical beam 314 that carries data, including the image full frames, toward mirror assembly 310. Server 328 also sends the current pose to beam steering controller 302 over wireless link 318. Mirror assembly 310 is adjusted by beam steering controller 302 controlling motor 311 based on the current pose of HMD 324 to direct the optical beam as optical beam 316 toward HMD 324 for reception at optical receivers 322a and 322b. As system 300 operates, the current pose is continuously updated by server 128, and appropriate image frames are sent from server 128 to HMD 124 for viewing by user 326. As user 326 moves within the area 336, user 326 is presented with a view that presents the virtual environment from the changing perspective of user 326.

Figure 3B:
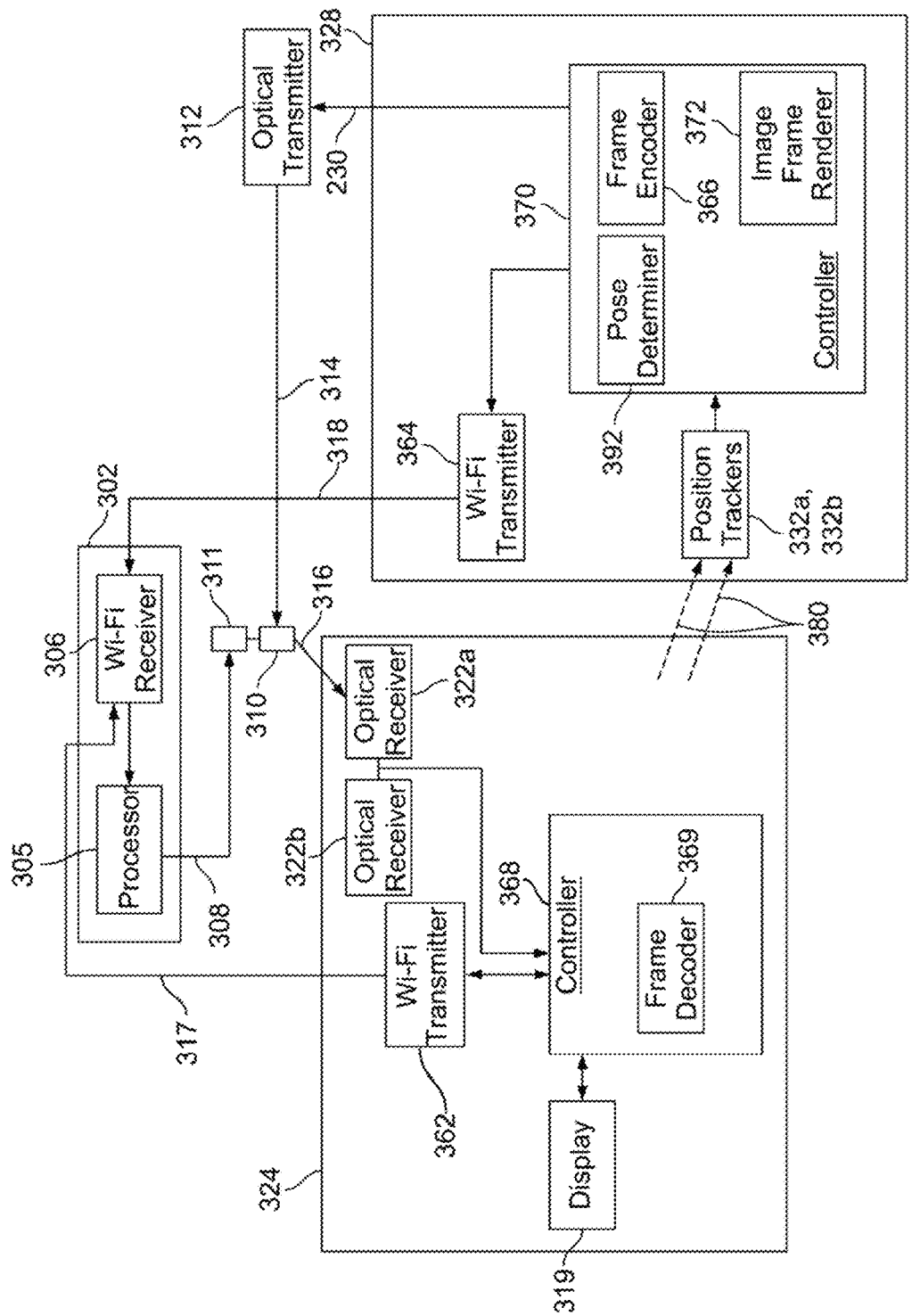
FIG. 3B is a simplified block diagram illustrating functions within the components of the system of FIG. 3A.

FIG. 3B is a simplified block diagram illustrating functions within the components of the system of FIG. 3A. FIG. 3B shows portions of beam steering controller 302, HMD 324, and server 328. HMD 324 includes display 319, Wi-Fi transmitter 362, optical receivers 322a and 1322b, and controller 368. Controller 368 includes frame decoder 369. Beam steering controller 302 includes processor 305 and Wi-Fi receiver 306. Server 328 includes Wi-Fi transmitter 364 and controller 370. Controller 370 includes pose determiner 392, frame encoder 366, and image frame render 372. Controller 368, controller 370, and processor 305 may be implemented using any type of processing circuitry, hardware and/or software, or using any combination of processing circuitry, hardware or software, and include memory for storing programs that provide appropriate functions.

In an implementation, controller 368 and controller 370 may comprise the sending and receiving ends of a High-Definition Multimedia Interface (HDMI) or display port over fiber link. This implementation provides an advantage by removing the latency caused by using a full video decoder, such as an H.264/H.265 decoder, at each end of the link.

In the implementation of system 300 of FIG. 3A, controller 368 of HMD 324 does not need to perform processing or rendering on image frames/cube maps retrieved from cache or perform any pose determination. Controller 368 only needs to receive data including full image frames sent from server 328 over optical beam 316 at optical receivers 322a and 322b, decode the full image frames from the received data, and display the image frames at display 319. The pose determination and full image frame rendering/processing is performed by server 328.

Figures 4A, 4B:
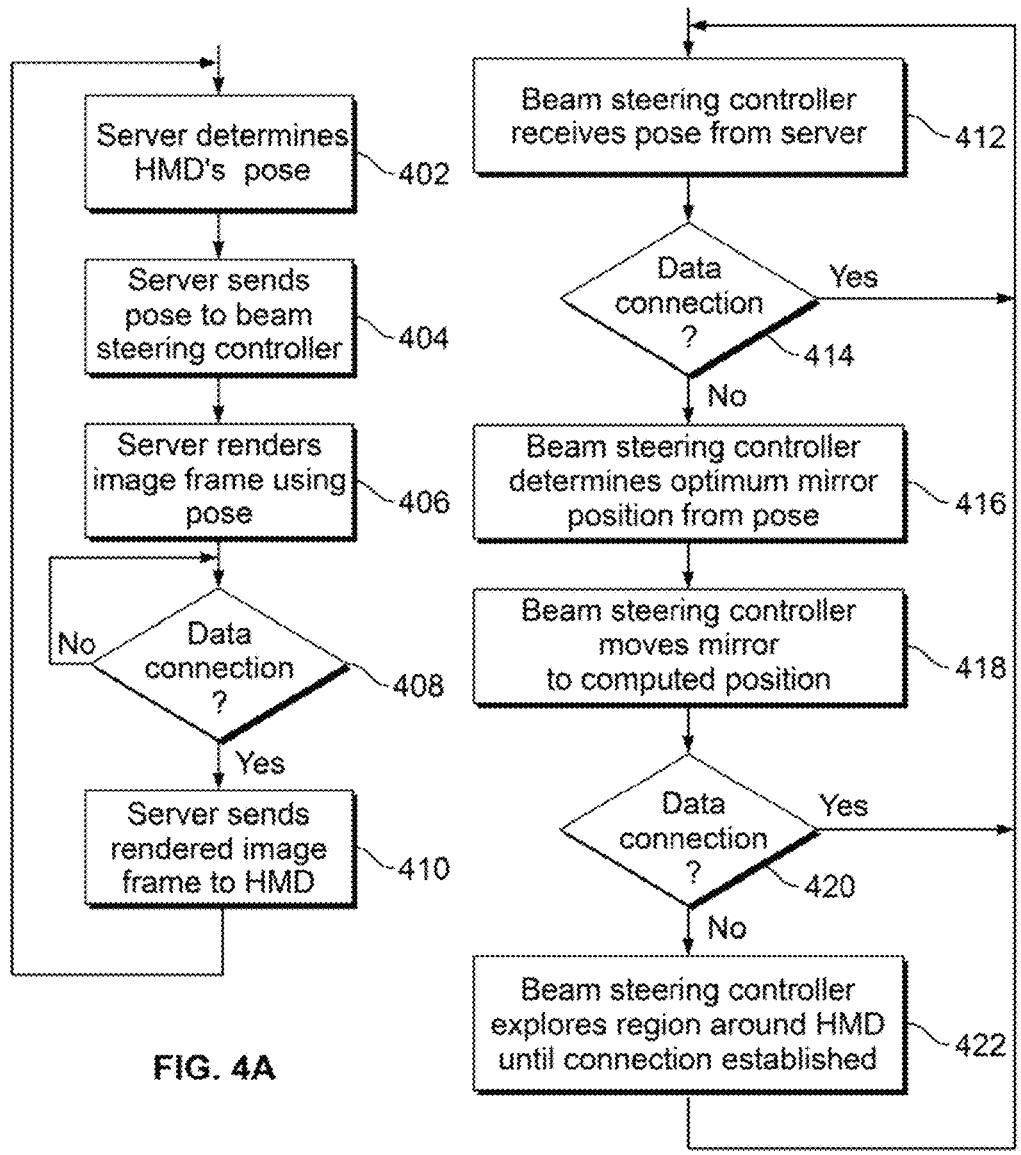
FIG. 4A is a simplified flow diagram illustrating example operations performed by another server.
FIG. 4B is a simplified flow diagram illustrating example operations performed by another beam steering apparatus.

FIG. 4A is a simplified flow diagram illustrating further example operations performed by a server. In an implementation, the server of FIG. 4A may be implemented as server 328 of FIGS. 3A and 3B.

The process begins at 402 where server 328 determines the current pose of HMD 324. Pose determiner 392 of controller 370 may determine current the pose using position data received from position trackers 332a and 332b. Position trackers 332a and 332b may comprises sensors such as cameras, or other types of sensors, and may provide the position data to server 328 from sensed input 380 that is sensed by the sensors while monitoring the movement of HMD 324. At 404, controller 370 sends the current pose to beam steering controller 302.

At 406, controller 370 renders a full image frame for the current pose in the virtual reality environment. Controller 370 also appropriately encodes the full image frame for transmission to HMD 324 at frame encoder 366.

At 408, controller 370 determines if a data connection is available on optical links 314 and 316 between server 328 and HMD 324. If a data connection is not available, controller 370 continues to monitor for a data connection. When a data connection is available the process moves to 410 and controller 370 initiates transmission of the full image frame rendered at 406 to HMD 324 over optical links 314 and 316. At 408 and 410, if the data connection is not available for longer than a threshold period of time, controller 370 may determine an updated current pose of HMD 324 based on the position data being received from position trackers 332a and 332b and render a new full image frame based on the updated current pose for transmission to HMD 324. Controller 370 may then initiate transmission of the full image frame based on the updated current pose when the data connection becomes available.

FIG. 4B is a simplified flow diagram illustrating example operations performed by a beam steering controller. In an implementation, the beam steering controller of FIG. 4B may be implemented as beam steering controller 302 of FIGS. 3A and 3B. The process of FIG. 4B may be performed by beam steering controller 102 during the same time period in which server 328 is performing the processes of FIG. 4A. By performing the process of FIG. 4B, beam steering controller 302 controls motor 311 and mirror assembly 310 to implement the data connection between server 328 and HMD 324 over optical links 314 and 316.

The process begins at 412 where the beam steering controller 302 receives the current pose of HMD 324 from server 328. Wi-Fi receiver 306 may receive the pose over wireless link 318 from Wi-Fi transmitter 364 of server 328. In one implementation, the pose may be sent to beam steering controller 302 by server 328 at the frame rate at which server renders and sends image frames to HMD 324 in the process of FIG. 4A.

At 414, processor 305 of beam steering controller 302 determines if there is a data connection currently available over optical links 316 and 314 with the current configuration setting of mirror assembly 310. Processor 305 may determine if a data connection is currently available by monitoring for an indication comprising feedback received from Wi-Fi transmitter 362 of HMD 324 over wireless link 317. For example, server 328 may periodically send an optical beam carrying a beacon/test signal over optical link 314 to mirror assembly 310 of beam steering controller. If mirror assembly is correctly configured to steer the optical beam to optical receiver 322a and/or 322b of HMD 324, HMD 324 may signal to beam steering controller 302 that the data connection is available each time HMD 324 receives the beacon/test signal. If there is a data connection available the process moves back to 412 where processor 305 will wait to receive the next current pose from server 328. If there is no data connection available, the process moves to 416.

At 416, processor 305 determines a setting for mirror assembly 310 based on the current pose of HMD 324 The current pose may be the last pose sent from server 328 at operation 404 of FIG. 4A and received at beam steering controller 302. In an implementation, processor 305 may use a vector regression model to predict the optimum setting as a function of the current pose of HMD 124. The support vector regression model used in operation 416 may be created by a calibration process in which an optimum setting of the mirror assembly for each of a set of test poses of HMD 324 are determined. Each of the test poses and their optimum settings may then be used create the vector regression model. Additionally, in a further implementation, the vector regression model may incorporate human motion prediction using, for example a hidden Markov model, a deep neural network (DNN) model, or error smoothing (e.g. a Kalman filter) in conjunction with data about detection of motion vs position tracker error. Use of these various implementations may increase the likelihood that the mirror assembly setting is adjusted because the user actually moved, not because there was noise in the headset position estimation.

At 418, processor 305 controls motor 311 to configure mirror assembly 310 according to the setting determined at 416 so that optical beam 314, that is sent from server 328 through optical transmitter 312, is steered toward HMD 324 as optical beam 316.

At 420, processor 305 determines if the data connection between server 328 and HMD 324 has been established by the configuring of the mirror assembly 110 performed at 418 based on feedback from HMD 324. If the data connection is established, the process moves back to 412. If the data connection is not established the process moves to 422.

At 422, processor 305 adjusts the setting determined at 416 based on a variation of the current pose and controls motor 311 to configure mirror assembly 310 according to the adjusted setting. The adjusted setting causes the optical beam 314 that is sent from server 328, through optical transmitter 312, to be steered toward HMD 324 as optical beam 316 at incrementally different angles and/or locations. Processor 305 then determines if the data connection between server 328 and HMD 324 is established based on feedback from HMD 324. If the data connection is not established, processor 305 will continue to adjust the setting for the mirror assembly 310 to gradually explore the region around the current pose (last received pose) of HMD 324 until the connection is established. If a new current pose is received from HMD 324 during operation 232, the process moves back to 412 where controller 305 processes the new current pose through the process of FIG. 4B.

Figures 5A, 5B:
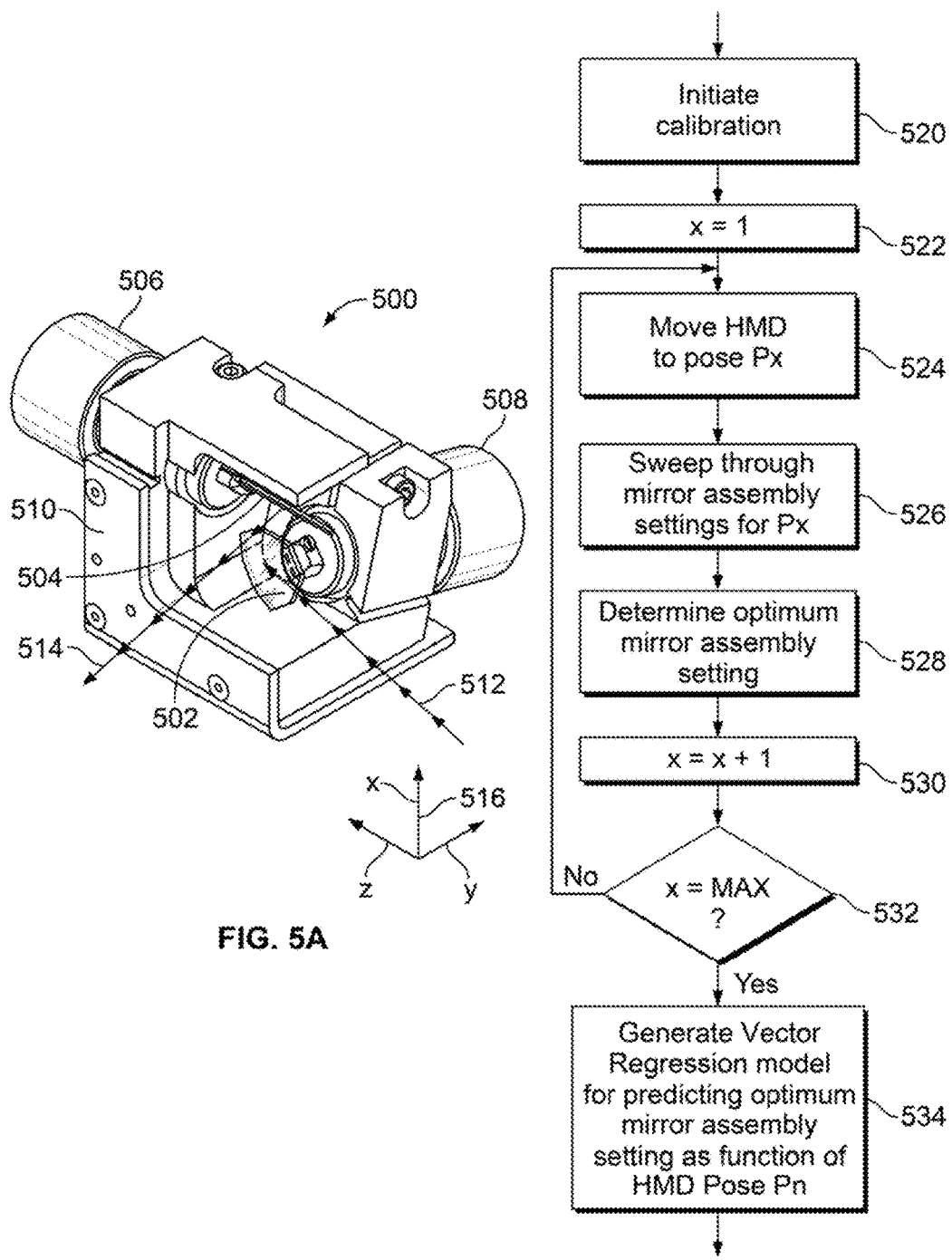
FIG. 5A illustrates an example portion of an assembly for a beam steering apparatus.
FIG. 5B is a flow diagram illustrating example operations for calibrating a beam steering apparatus.

FIG. 5A illustrates an example assembly for a beam steering apparatus used in implementations of FIGS. 1A-4B. Assembly 500 of FIG. 5A may be used to implement the functions provided by motor 111 and mirror assembly 110 of FIGS. 1A and 1B, or the functions provided by motor 311 and mirror assembly 310 of FIGS. 3A and 3B. Assembly 500 includes mirror 502, mirror 504, motor 506, motor 508, and mounting frame 510. FIG. 5 also shows a representative optical beam 512 that is directed into assembly 500 and a representative optical beam 514 that is exiting assembly 500. The configuration of assembly 500 allows motor 508 and motor 506 to be activated to change the angle of mirror 502 relative to the z-axis of reference coordinates 516 and the angle of mirror 504 relative to the y-axis of reference coordinates 516, respectively. In an implementation of system 100 of FIGS. 1A and 1B, assembly 500 may be mounted in an elevated position above the area 136 in which the user 126 is located. Mounting frame 510 may mounted with an orientation that allows optical beam 114 (as represented by optical beam 512 in FIG. 5) to be transmit into assembly 500 and allows optical beam 116 (as represented by optical beam 514 in FIG. 5) to exit assembly 500 in a direction toward HMD 124. Beam steering controller 102 may then control motor 506 and motor 508 to change the angles of mirrors 502 and 504 as user 126 moves in order that optical beam 114 is continuously directed to HMD 124. Optical beam 116 may then be received by optical receiver 122a and/or optical receiver 122b. In an implementation of system 300 of FIGS. 3A and 3B, assembly 500 may be mounted in an elevated position above the area 336 in which user 326 is located. Mounting frame 510 may mounted with an orientation that allows optical beam 314 (as represented by optical beam 512) to be transmit into assembly 500 and allows optical beam 116 (as represented by optical beam 514) to exit assembly in a direction toward HMD 324. Beam steering controller 302 may then control motor 506 and motor 508 to change the angles of mirrors 502 and 504 as user 326 moves so that optical beam 314 is continuously directed to HMD 324. Optical beam 316 may then be received by optical receiver 322a and/or optical receiver 322b.

FIG. 5B is a flow diagram illustrating example operations for calibrating a beam steering controller. The process of FIG. 5B may be explained using an example of calibration performed for beam steering controller 102 of FIG. 1A with motor 111 and mirror assembly 110 implemented as assembly 500 of FIG. 5A. The calibration of beam steering controller 302 of FIG. 3A may be similar.

The process begins at 520 where the appropriate calibration programs are initiated in beam steering controller 102, HMD 124, and server 128 of system 100. Next, at 522, a pose index X is set to 1 by beam steering controller 102 to initialize the process.

At 524, HMD 324 is moved and oriented into a pose $P_X$. The calibration will be performed using a set of poses, each represented by a pose $P_X$, X=1 to MAX, where MAX is an integer one greater than the number of poses in the set. Each pose may be defined by a set of coordinates ((x, y, z), (θ, φ, Ψ)). The parameters (x, y, z) may represent the position of HMD 124 in 3D coordinates in relation to the virtual environment, while the parameters (θ, φ, Ψ) may represent the view orientation (sometimes referred to as rotation) as an Euler angle comprising yaw, pitch, and roll, respectively, of HMD 124. MAX may be set to provide a number of poses that provides a desired accuracy/performance level for system 100. In an implementation, HMD 124 may be moved and oriented manually by directing a person wearing HMD 124 to each of the poses $P_X$, X=1 to MAX. In another implementation, HMD 124 may be moved and oriented to each of the poses $P_X$, X=1 to MAX, using an automated/programmed mechanical or robotic type positioning device controlled by beam steering controller 102.

At 526, optical transmitter 112 is controlled by Server 128 to transmit a calibration signal in optical beam 114 toward mirror 502 of assembly 500. The calibration programs cause beam steering controller 102 to sweep through a series of settings for the angles of mirrors 502 and 504 of assembly 500 associated with pose $P_X$ so that optical beam 114 is steered and directed as optical beam 116 into and around the area in which HMD 324 is located for pose $P_X$. A received power of the calibration signal received in optical beam 116 at optical receiver 122a and/or optical receiver 122b of HMD 324 may be measured at each of the series of settings. Feedback/measurement data may be provided from HMD 324 to beam steering controller 102 and/or server 128 as the calibration takes place to coordinate the operation at 526.

At 528, beam steering controller 102 determines the optimum setting for pose $P_X$ based on the received power at each of the settings used at 526. Pose $P_X$ and its associated optimum setting are stored as calibration data in a database. Next, at 530, the index X is incremented by 1.

At 532, beam steering controller 102 determines if X=MAX. If X is not equal to MAX, the process moves to 524 and repeats operations 524, 526, 528, and 532. If X is equal to MAX, the process moves to 534. At 534, beam steering controller 102 uses the calibration data collected at 528 to generate a vector regression model for predicting the optimal settings for the angles of mirrors 502 and 504 of assembly 500 as a function of the pose $P_X$ of HMD 124. The vector regression model may then be used by beam steering controller 102 during operation of system 100.

While the implementations shown in FIGS. 1A-FIG. 5B have been described as having a beam steering apparatus and optical transmitter comprising particular components, other implementations of a virtual reality system may be realized using any type of apparatus that allows an optical connection to be created and maintained between a server and an HMD. For example, any apparatus, or combination of devices, that is able to receive data, or an optical beam carrying data, from a computing device such as server 128 or 328, and cause an optical beam to be directed toward a HDM type device to allow the HMD type device to receive the data as it moves may be utilized. This may include any type of apparatus that generates and directs an optical beam, or receives and steers an optical beam, toward the HMD based on movement of the HMD using any type of mechanical, electrical, or electro-optical mechanism, or combination of these mechanisms.

Figure 6A:
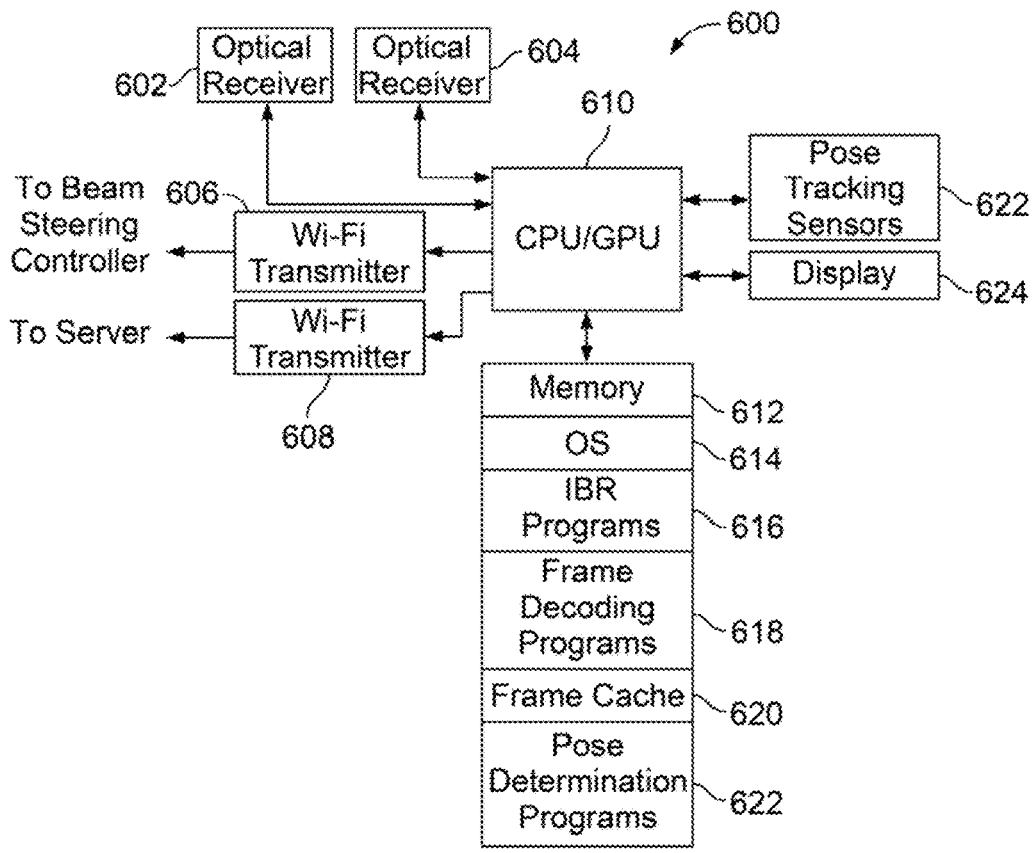
FIG. 6A illustrates a simplified block diagram of an example device.

FIG. 6A illustrates a simplified block diagram of an example device 600. Device 600 may include a central processing unit/graphics processing unit (CPU/GPU) 610, memory 612, pose tracking sensors 622, display 624, Wi-Fi transmitter 606, Wi-Fi transmitter 608, optical receiver 602, and optical receiver 604. Memory 612 may be implemented as any type of computer readable storage media, including non-volatile and volatile memory. Memory 612 is shown as including code comprising device operating system (OS) 614, image base rendering (IBR) programs 616, frame decoding programs 618, pose determination programs 622, and frame cache 620. Pose tracking sensors 622 may comprise one or more sensors on device 600 that provide device position and orientation information to CPU/GPU 610. Display 624 may comprise a display mounted to show VR scenes in view of a user's eyes when device 600 is worn as a HMD. CPU/GPU 600 may comprise one or more processors, or other control circuitry, or any combination of processors and control circuitry.

In an example implementation, device 600 may be implemented as HMD 124 of FIGS. 1A and 1B. In this implementation, CPU/GPU 600 controls Wi-Fi transmitters 606 and 608, optical receivers 602 and 604, pose tracking sensors 622, and display 624, and executes IBR programs 616, frame decoding programs, and pose determination programs 622 to perform the operations shown in FIG. 2A. Wi-Fi transmitter 606 and Wi-Fi transmitter 608 may be configured to transmit signals and/or data to beam steering controller 102 and server 128, respectively according to the process of FIG. 2A. In other example implementations, device 600 may be implemented as any other type of mobile device that may be configured to allow a user to interact with a virtual environment according to implementations of the disclosure.

Figure 6B:
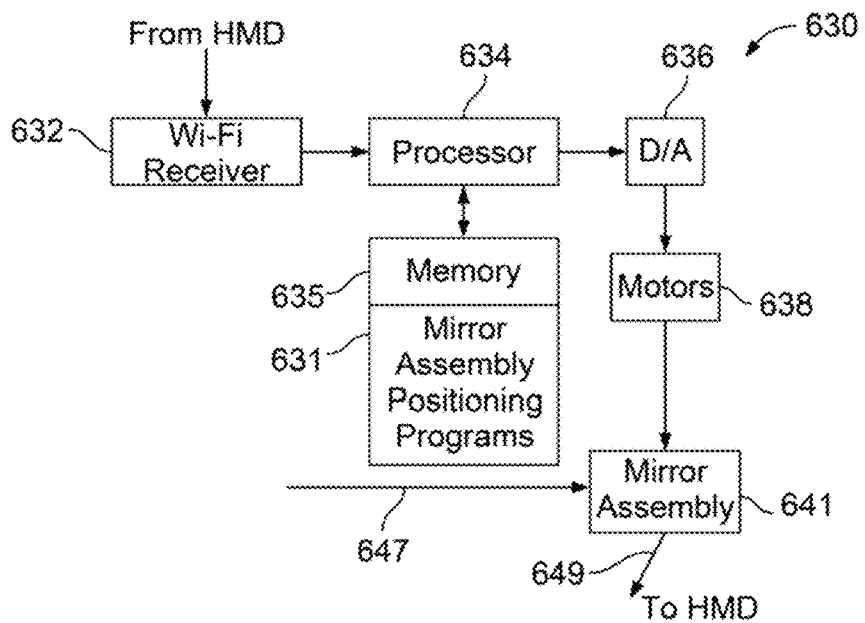
FIG. 6B illustrates a simplified block diagram of an example beam steering apparatus.

FIG. 6B illustrates a simplified block diagram of an example apparatus 630. Apparatus 630 may include a processor 634, memory 635, digital to analog converter (D/A) 636, motors 638, mirror assembly 641, and Wi-Fi receiver 632. In Operation, apparatus 630 receives optical beam 647 at mirror assembly 641 and steers the beam toward a HMD as optical beam 649. Memory 635 may be implemented as any type of computer readable storage media, including non-volatile and volatile memory. Memory 635 is shown as including code comprising mirror assembly positioning programs 631. Processor 634 may comprise one or more processors, or other control circuitry, or any combination of processors and control circuitry.

In an example implementation, apparatus 634 may be implemented as the beam steering apparatus FIGS. 1A and 1B that includes beam steering controller 102, motors 111, and mirror assembly 110. In this implementation, processor 634 controls Wi-Fi receiver 632, motors 638, and mirror assembly 641, and, executes mirror assembly positioning programs 631 to perform the operations of FIG. 2C. Apparatus 634 receives optical beam 114 (647) sent by optical transmitter 112 at mirror assembly 641 and steers the beam to HMD 124 as optical beam 116 (649).

Figure 6C:
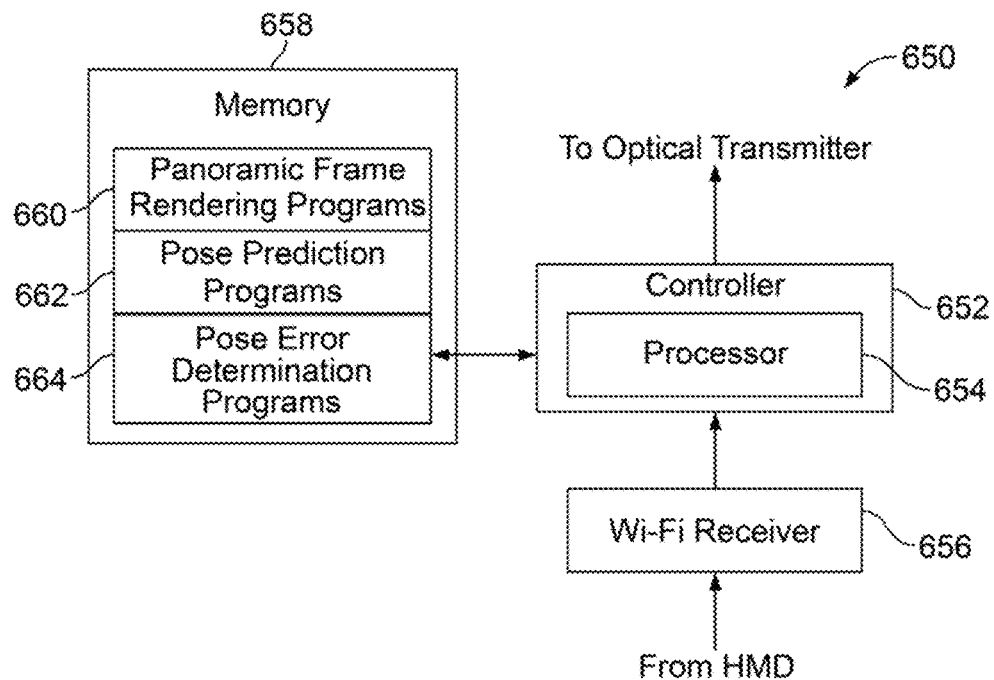
FIG. 6C illustrates a simplified block diagram of an example server.

FIG. 6C illustrates a simplified block diagram of an example server 650. Server 650 may include a controller 652 that includes processor 654, Wi-Fi receiver 656, and memory 658. Memory 658 includes panoramic frame rendering programs 660, pose prediction programs 662, and pose error determination programs 664. Memory 658 may be implemented as any type of computer readable storage media, including non-volatile and volatile memory. Processor 654 may comprise one or more processors, or other control circuitry, or any combination of processors and control circuitry.

In an example implementation, server 650 may be implemented as server 128 of FIGS. 1A and 1B. In this implementation, processor 654 controls Wi-Fi receiver 656 and executes panoramic frame rendering programs 660, pose prediction programs 662, and pose error determination programs 664 to perform the operations of FIG. 2B. Server 650 receives pose data from HMD 124 at Wi-Fi receiver 656 and provides image frames to optical transmitter 112 for transmission to HMD 124

Figure 7A:
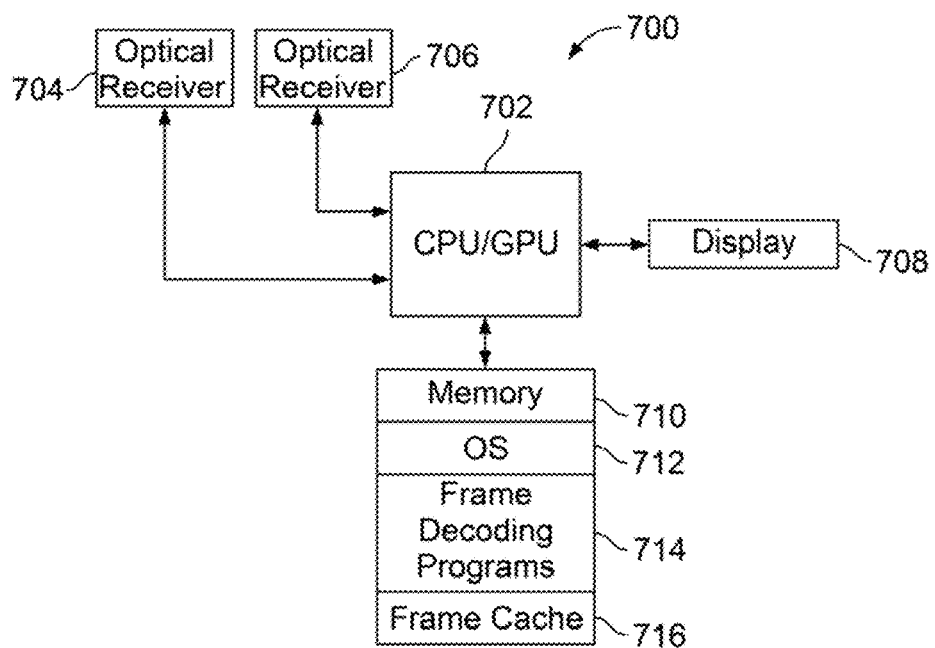
FIG. 7A illustrates a simplified block diagram of another example device.

FIG. 7A illustrates a simplified block diagram of another example device 700. Device 700 may include a central processing unit/graphics processing unit (CPU/GPU) 702, memory 710, display 708, optical receiver 704, and optical receiver 706. Memory 710 may be implemented as any type of computer readable storage media, including non-volatile and volatile memory. Memory 710 is shown as including code comprising device operating system (OS) 712, frame decoding programs 714, and frame cache 716. Display 708 may comprise a display mounted to show VR scenes in view of a user's eyes when device 700 is worn as a HMD. CPU/GPU 702 may comprise one or more processors, or other control circuitry, or any combination of processors and control circuitry.

In an example implementation, device 700 may be implemented as HMD 324 of FIGS. 3A and 3B. In this implementation, CPU/GPU 702 controls optical receivers 704 and 706 and display 708, and executes frame decoding programs 714 to perform the operations the operations of HMD 324 as was described in relation to FIGS. 3A and 3B. In other example implementations, device 700 may be implemented as any other type of mobile device that may be configured to allow a user to interact with a virtual environment according to implementations of the disclosure.

Figure 7B:
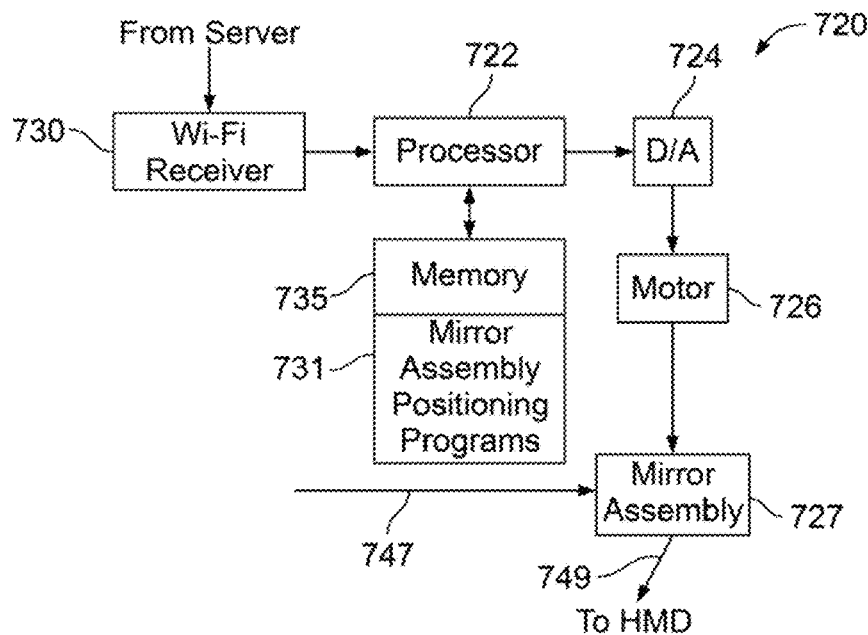
FIG. 7B illustrates a simplified block diagram of another example beam steering apparatus.

FIG. 7B illustrates a simplified block diagram of another example apparatus 720. Apparatus 720 may include a processor 722, memory 735, digital to analog converter (D/A) 724, motors 726, mirror assembly 727, and Wi-Fi receiver 730. In Operation, apparatus 720 receives optical beam 747 at mirror assembly 727 and steers the beam toward a desired location as optical beam 749.

Memory 735 may be implemented as any type of computer readable storage media, including non-volatile and volatile memory. Memory 735 is shown as including code comprising mirror assembly positioning programs 731. Processor 722 may comprise one or more processors, or other control circuitry, or any combination of processors and control circuitry.

In an example implementation, apparatus 720 may be implemented as the beam steering apparatus FIGS. 3A and 3B that includes beam steering controller 302, motors 311, and mirror assembly 310. In this implementation, processor 722 controls Wi-Fi receiver 730, motors 726, and mirror assembly 727, and, executes mirror assembly positioning programs 731 to perform the operations of FIG. 4B. Apparatus 720 receives optical beam 114 (747) sent by optical transmitter 312 at mirror assembly 727 and steers the beam to HMD 324 as optical beam 116 (749).

Figure 7C:
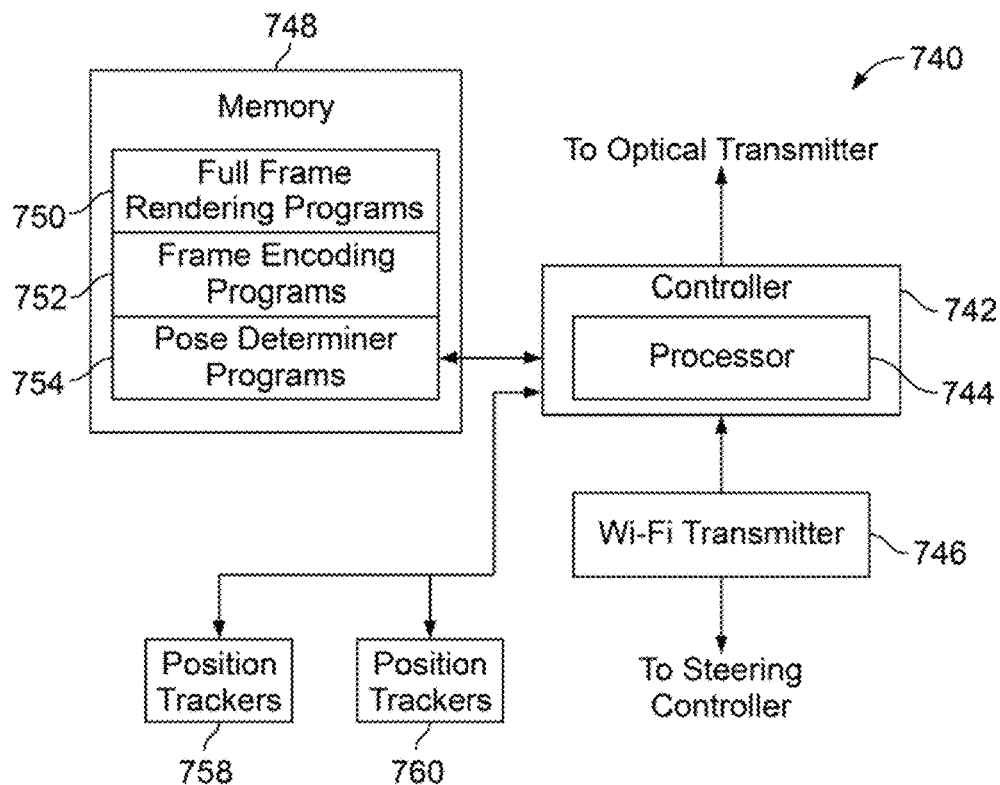
FIG. 7C illustrates a simplified block diagram of another example server.

FIG. 7C illustrates a simplified block diagram of an example server 740. Server 740 may include a controller 742 that includes processor 744, Wi-Fi transmitter 746, position trackers 758 and 760, and memory 748. Memory 748 includes full frame rendering programs 750, frame encoding programs 752, and pose determiner programs 754. Memory 748 may be implemented as any type of computer readable storage media, including non-volatile and volatile memory. Processor 744 may comprise one or more processors, or other control circuitry, or any combination of processors and control circuitry.

In an example implementation, the photo server 740 may be implemented as server 328 of FIGS. 3A and 3B. In this implementation, processor 744 controls position trackers 758 and 760, and Wi-Fi transmitter 364, and executes frame rendering programs 750, frame encoding programs 752, and pose determiner programs 754 to perform the operations of FIG. 4A. Server 328 determines the pose of HMD 324 based on data from positon trackers 758 and 760, sends the pose to beam steering controller 302 using Wi-Fi transmitter 746, and provides image frames to HMD 324 through optical transmitter 312.

In another example implementation, the optical receivers of HMDs in the various implementations may each be implemented using an array of photodetectors to attain a desired data rate. The implementation of the array of photodetectors may be configured to take advantage of the fact that, generally, use of a photo detector with a small active area is able to provide a higher data rate than use of a photodetector with a relatively bigger active area. For example, in the system of FIG. 1A, photodetectors 122*a* and 122*b* may be implemented using arrays to of multiple photodetectors to take advantage of this property.

Figure 8A:
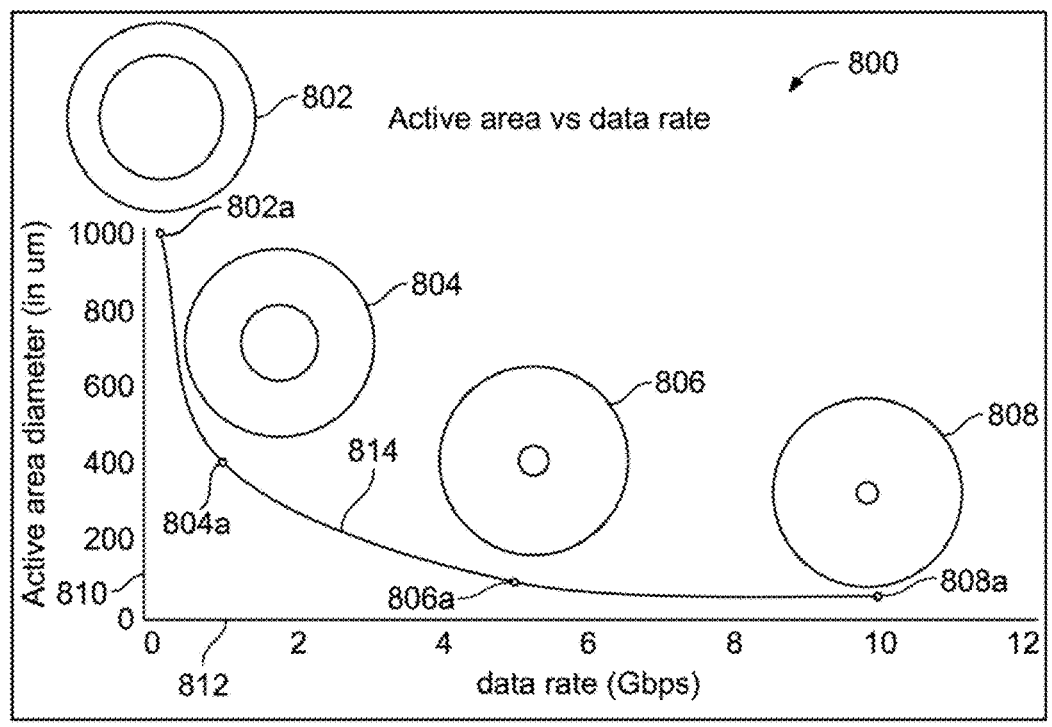
FIG. 8A illustrates a relationship between active area and attainable data rate for an example photodetector; and, FIG. 8B illustrates an example photodetector array.

FIG. 8A is a plot showing an example relationship between active area of example photodetectors and attainable data rate. In FIG. 8A, active area is shown on axis 810 and data rate is show on axis 812. Curve 814 represents the relationship of active area of the photodetector versus attainable data rate. The outer circumference of circular areas 802, 804, 806, and 808 represent a diameter of approximately 1 mm. The inner circle of circular areas 802, 804, 806, and 808 represent a visualization of various sizes of the active area of the photodetector at corresponding points 802*a*, 804*b*, 806*c*, and 808*d*, respectively, on curve 814. It can be seen that as the active area of a photodetector is reduced from approximately 1000 um (1 mm) (at 802) to approximately 20 um (at 808) the available data rate increases to approximately 10 GBPS.

Figure 8B:
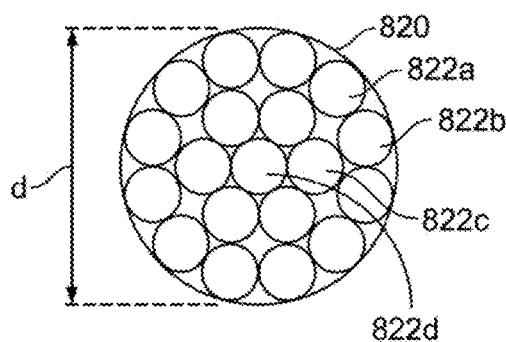

FIG. 8B illustrates an example implementation of a photodetector array that may be configured using photodetectors having properties similar to those represented by curve 814 of FIG. 8A. In FIG. 8B, array 820 is shown as comprising multiple photodetectors, including representative photodetectors 822*a*, 822*b*, 822*c*, and 822*d*. In FIG. 8B a total of 19 photodetectors, including photodetectors 822*a*, 822*b*, 822*c*, and 822*d* are included in array 820. The array 820 has a diameter d. The view in FIG. 8B is shown from a position perpendicular to the surfaces of the active areas of the photodetectors of array 820. The photodetectors may be connected together in parallel at a point (not shown) within the array 820 that is located a distance from their active areas so that input signals received at any of the separate photodetectors may be input on the same connection into the optical receiver. Each individual photodetector of array 820 may then function to receive a beam for the optical receiver in parallel with one another.

In the example implementation, array 820 may be used in a virtual reality system in which a beam steering device transmits beam of approximately 20 micro meters in diameter toward array 820. The dimensions of the array 820 may be configured based on the accuracy of the beam steering device and the diameter of the beam. For example, the beam steering device may have an accuracy that ensures with a high probability that the beam will be within a 1 mm circle centered on the point aimed for by the system. In this case, each photodetector of array 820 may be approximately 20 micro meters in diameter. The diameter d of array 820 may then be approximately 1 mm. For example, this means that when the beam is aimed at center photodetector 820*d* there is a high probability that the 20 mm beam will fall somewhere within the 1 mm diameter of array 820 on one or more of the individual photodetectors. Any of the one or more of the photodetectors on which the beam falls then will generate a signal to the optical receiver. Because the beam and photodetectors each have an area of approximately 20 mm, data rates close to the data rates for a 20 mm photodetector may be attained. The configuration of FIG. 8B provides the data rate of a 20 um photodetector with the larger coverage area of a 1 mm surface area. This may provide an advantage in a system such as system 100 of FIG. 1A. Because optical receivers 122*a* and 122*b* of HMD 124 of system 100 are mobile, the extra surface area of the 1 mm diameter of array 100 provides a level or tolerance for the aiming of the beam from beam steering apparatus 102 toward a moving HMD 124. At the same time, the 20 um diameter of each individual photo detector in the configuration of array 820 allows a higher data rate than if a single 1 mm diameter photodetector would be used to provide a larger coverage area.

In other implementations, a single photodetector of relatively small diameter may be used in combination with additional mechanisms for providing feedback to the system for beam steering. For example, the single photodetector may be configured to receive data and a mechanism may be configured in the proximity of the single photodetector to provide feedback. The mechanism may be configured to determine the error with which a beam is directed at the single photodetector and provide feedback about the error to the system. In one example of this implementation, the single photodetector may be implemented as a single photodetector that is surrounded by one or more other larger photodetectors. One possible configuration would appear similar to the array 820 of FIG. 8B, with the 18 photodetectors that surround photodetector 822*d* replaced with a smaller number of photodetectors of larger diameter. In this case photodetector 822*d* would be the only data receiving photodetector and the surface area of the other larger photodetectors would form an error sensing area around the single photodetector. The error sensing area may be used to sense the beam's actual location and provide feedback to the system so that the beam may be steered more accurately toward the single photodetector. The use of other techniques may also be combined with the disclosed aspects of the system. For example, various techniques may be used in the various implementations to sense when an optical beam steered toward an optical receiver on a HMD is blocked by an object or a human being and turn off the optical transmitter during that time period.

The example embodiments disclosed herein may be described in the general context of processor-executable code, programs, or instructions stored on memory that may comprise one or more computer readable storage media (e.g., tangible non-transitory computer-readable storage medium). As should be readily understood, the terms "computer-readable storage media" or "non-transitory computer-readable media" include the media for storing of data, code and program instructions and do not include portions of the media for storing transitory propagated or modulated data communication signals.

While the functionality disclosed herein has been described by illustrative example using descriptions of the various components and devices of embodiments by referring to functional blocks and processors or processing units, controllers, and memory including instructions, programs, and code, the functions and processes of the embodiments may be implemented and performed using any appropriate functional blocks, type of processor, circuitry or combinations of processors and/or circuitry and code. This may include, at least in part, one or more hardware logic components. For example, and without limitation, illustrative types of hardware logic components that can be used include field programmable gate arrays (FPGAs), application specific integrated circuits (ASICs), application specific standard products (ASSPs), system-on-a-chip systems (SOCs), complex programmable logic devices (CPLDs), etc. Use of the term processor or processing unit in this disclosure is mean to include all such implementations.

The implementations of the disclosure include a portable device comprising an optical receiver, a display, one or more processors coupled to the display and the optical receiver and memory in communication with the one or more processors. The memory includes code executable by the one or more processors to control the device to receive at least one image frame at the optical receiver, the at least one image frame associated with a virtual environment, generate an image of the virtual environment from a selected image frame of the at least one image frame, and display the generated image of the virtual environment on the display. The memory may further include a cache, the at least one image frame may comprise a plurality of image frames, and the code may be further executable by the one or more processors to control the device to store the plurality of image frames in the cache, determine a pose associated with the device in the virtual environment, select the selected image frame of the plurality of image frames from the cache based at least on the pose, and retrieve the selected image frame from the cache for use in the generation of the image. The code may be executable by the one or more processors to control the device to select the selected image frame by determining that the selected image frame best matches the pose as compared to other image frames of the plurality of image frames stored in the cache. Each of the plurality of images frames may comprise a panoramic frame and the code may be executable by the one or more processors control the device to generate the image of the virtual environment by performing image based rendering on the selected image frame. The code may be executable by the one or more processors to repeat, at a frame rate, the determining the pose, the selecting the selected image frame from the cache, the retrieving the selected image frame from the cache, the generating the image of the virtual environment, and the displaying the generated image on the display. The frame rate may be independent of the rate at which each of the plurality of image frames is received at the optical receiver, and, the determining the pose, the selecting the selected image frame from the cache, the retrieving the selected image frame from the cache, the generating the image of the virtual environment, and the displaying the generated image on the display, may be repeated one or more times during a period when no image frame of the plurality of image frames is received at the optical receiver. The portable device may comprise at least one sensor coupled to the one or more processors, and the code may be further executable by the one or more processors to determine the pose by controlling the device to receive data comprising data on the 3D position and 3D orientation of the device from the at least one sensor, and determine the pose of the device in the virtual environment from the data. The at least one image frame may comprise at least one panoramic frame and at least one additional frame that includes an additional view associated with the at least one panoramic frame. The portable device may comprise a head mounted display. Each at least one image frame may comprise a cube map.

The implementations of the disclosure also include an apparatus comprising a beam steering device, one or more processors and a memory communicating with the one or more processors. The memory comprising code executable by the one or more processors to receive a pose, the pose indicating the position and orientation of a portable device relative to a virtual environment, determine a setting for the beam steering device based at least on the pose, wherein the setting configures the beam steering device to direct an optical beam including data to the portable device, and, set the beam steering device to the determined setting to create a data connection between a computer device and the portable device. The setting may configure the beam steering device to receive the optical beam from an optical transmitter associated with the computing device and direct the optical beam to the portable device. The beam steering device may comprises one or more mirrors and the setting may configure the beam steering device by changing a position of at least one of the one or more mirrors. The code may be further executable by the one or more processors to determine whether the data connection has been established, and, if the data connection has not been established, adjust the setting based on at least one variation to the pose to create the data connection between the computer device and the portable device. The pose may comprise a first pose and the memory may further comprise a database including data that associates each of a plurality of second poses with a corresponding setting for the beam steering device. The pose may comprise a first pose and the code may be executable by the one or more processors to determine the setting for the beam steering device by determining the setting for the beam steering device based at least on the first pose and a prediction of a future second pose of the mobile device.

The implementations of the disclosure further include a system comprising an optical transmitter, and a server device coupled to the optical transmitter. The server may include one or more processors coupled to the optical transmitter and memory in communication with the one or more processors. The memory may include code executable by the one or more processors to control the server device to render at least one image frame for use by the mobile device based at least on a pose indicating the position and orientation of a mobile device relative to a virtual environment, wherein the at least one image frame is associated with an image of the virtual environment, and, send the at least one image frame to the optical transmitter for transmission to the mobile device. The optical transmitter may transmit the at least one image frame in an optical beam, and the system may further comprise a beam steering device that is configurable, based at least on the pose, to receive the optical beam carrying the at least one image frame from the optical transmitter and steer the beam to the mobile device. The at least one image frame comprises a panoramic frame. The at least one image frame may comprise at least one panoramic frame and at least one additional frame that includes an additional view associated with the at least one panoramic frame.

Although the subject matter has been described in language specific to structural features and/or methodological operations or acts, it is to be understood that the subject matter defined in the appended claims is not necessarily limited to the specific features, operations, or acts described above. Rather, the specific features, operations, and acts described above are disclosed as example embodiments, implementations, and forms of implementing the claims and these example configurations and arrangements may be changed significantly without departing from the scope of the present disclosure. Moreover, although the example embodiments have been illustrated with reference to particular elements and operations that facilitate the processes, these elements, and operations may or combined with or, be replaced by, any suitable devices, components, architecture or process that achieves the intended functionality of the embodiment. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

What is claimed is:

1. A portable device comprising:
an optical receiver;
a display;
one or more processors coupled to the display and the optical receiver; and,
memory in communication with the one or more processors, the memory including code executable by the one or more processors to control the portable device to:
receive at least one image frame at the optical receiver, the at least one image frame associated with a virtual environment;
generate an image of the virtual environment from a selected image frame of the at least one image frame; and,
display the image of the virtual environment on the display,
wherein the memory further includes a cache, the at least one image frame comprises a plurality of image frames, and the code is further executable by the one or more processors to control the device to:
store the plurality of image frames in the cache; and,
determine a pose associated with the portable device in the virtual environment;
select the selected image frame of the plurality of image frames stored in the cache based at least on the pose; and,
generate the image of the virtual environment from the selected image frame of the plurality of image frames,
wherein the code is executable by the one or more processors to repeat, at a frame rate, the determining the pose, the selecting the selected image frame from the cache, the generating the image of the virtual environment, and the displaying the image on the display,
wherein the frame rate is independent of the rate at which each of the plurality of image frames is received at the optical receiver, and, wherein, the determining the pose, the selecting the selected image frame from the cache, the generating the image of the virtual environment, and the displaying the image on the display, may be repeated one or more times during a period when no image frame of the plurality of image frames is received at the optical receiver.

2. The portable device of claim 1, wherein the code is executable by the one or more processors control the device to select the selected image frame by determining that the selected image frame best matches the pose as compared to other image frames of the plurality of image frames stored in the cache.

3. The portable device of claim 1, wherein each of the plurality of images frames comprises a panoramic frame and the code is executable by the one or more processors control the device to generate the image of the virtual environment by performing image based rendering on the selected image frame.

4. The portable device of claim 1, wherein portable device comprises at least one sensor coupled to the one or more processors, and the code is further executable by the one or more processors to determine the pose by controlling the device to:
receive data comprising data on the 3D position and 3D orientation of the device from the at least one sensor; and,
determine the pose of the device associated with the virtual environment from the data.

5. The portable device of claim 1, wherein the at least one image frame comprises at least one panoramic frame and at least one additional frame that includes an additional view associated with the at least one panoramic frame.

6. The portable device of claim 1, wherein the optical receiver includes an array comprising a plurality of photodetectors.

7. The portable device of claim 1, wherein each at least one image frame comprises a cube map.

8. A system comprising:
an optical transmitter; and,
a server coupled to the optical transmitter and including:
one or more processors coupled to the optical transmitter; and,
memory in communication with the one or more processors, the memory including code executable by the one or more processors to control the server to:
render at least one image frame for use by a portable device based at least on a pose indicating the position and orientation of the portable device relative to a virtual environment; and,
provide the at least one image frame to the optical transmitter for transmission to the mobile device,
wherein the memory further includes a cache, the at least one image frame comprises a plurality of image frames, and the code is further executable by the one or more processors to control the device to:
store the plurality of image frames in the cache; and,
select the selected image frame of the plurality of image frames stored in the cache based at least on the pose; and,
provide the selected image frame of the plurality of image frames as the at least one image frame that is provided to the optical transmitter for transmission to the mobile device,
wherein the code is executable by the one or more processors to repeat, at a frame rate, the determining the pose, the selecting the selected image frame from the cache, the generating the image of the virtual environment, and the displaying the image on the display,
wherein the frame rate is independent of the rate at which each of the plurality of image frames is received at the optical receiver, and, wherein, the determining the pose, the selecting the selected image frame from the cache, the generating the image of the virtual environment, and the displaying the image on the display, may be repeated one or more times during a period when no image frame of the plurality of image frames is received at the optical receiver.

9. The system of claim 8, wherein the optical transmitter transmits the at least one image frame in an optical beam, and the system further comprises a beam steering device that is configurable, based at least on the pose, to receive the optical beam carrying the at least one image frame from the optical transmitter and steer the beam to the portable device.

10. The system of claim 8, wherein the at least one image frame comprises a panoramic frame.

11. The system of claim 8, wherein the at least one image frame comprises at least one panoramic frame and at least one additional frame that includes an additional view associated with the at least one panoramic frame.

* * * * *